(12) United States Patent
Kim et al.

(10) Patent No.: US 8,700,097 B2
(45) Date of Patent: Apr. 15, 2014

(54) METHOD AND SYSTEM FOR CONTROLLING DUAL-PROCESSING OF SCREEN DATA IN MOBILE TERMINAL HAVING PROJECTOR FUNCTION

(75) Inventors: Phil Jun Kim, Gyeonggi-do (KR); Sung Bae Kim, Gyeonggi-do (KR); Bo Sung Kim, Gyeonggi-do (KR); Tae Young Kim, Gyeonggi-do (KR); Young Ho Cho, Seoul (KR); Young Il Choi, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 228 days.

(21) Appl. No.: 12/700,011

(22) Filed: Feb. 4, 2010

(65) Prior Publication Data
US 2010/0210312 A1    Aug. 19, 2010

(30) Foreign Application Priority Data

Feb. 5, 2009   (KR) .................. 10-2009-0009493
Feb. 26, 2009  (KR) .................. 10-2009-0016468

(51) Int. Cl.
*H04B 1/38*    (2006.01)

(52) U.S. Cl.
USPC ........ 455/566; 455/556.1; 348/744; 345/156; 345/173; 353/39

(58) Field of Classification Search
USPC .................. 353/39, 121, 122; 345/156, 173; 348/744; 455/556.1, 566, 574
See application file for complete search history.

(56) References Cited

U.S. PATENT DOCUMENTS

| | | | |
|---|---|---|---|
| 8,023,996 B2* | 9/2011 | Camp, Jr. .................... | 455/556.1 |
| 8,427,511 B2* | 4/2013 | Shin et al. ..................... | 345/661 |
| 2007/0265717 A1* | 11/2007 | Chang ........................ | 700/83 |
| 2007/0271525 A1* | 11/2007 | Han et al. .................... | 715/786 |
| 2007/0285626 A1* | 12/2007 | Miyasaka .................... | 353/85 |
| 2008/0014995 A1* | 1/2008 | Noba ........................... | 455/566 |
| 2008/0070553 A1* | 3/2008 | Yamakawa et al. .......... | 455/413 |
| 2008/0088651 A1* | 4/2008 | Maeda et al. ................. | 345/694 |
| 2009/0143098 A1* | 6/2009 | Shiono ....................... | 455/556.1 |

* cited by examiner

*Primary Examiner* — Patrick Edouard
*Assistant Examiner* — Shantell L Heiber
(74) *Attorney, Agent, or Firm* — Cha + Reiter, LLC.

(57) ABSTRACT

A method of controlling a screen of a mobile terminal having a projector function and an apparatus permits outputs of common screen data and dual-processed data output by a display screen and an external screen. A method of outputting screen data in a mobile terminal having a projector function includes: activating a projector module; generating screen data for a display unit displayed on a display unit and screen data for a projector based on the projector module; and performing dual-processing of the generated screen data and outputting the dual-processed screen data to the display unit and the projector module.

28 Claims, 16 Drawing Sheets

METHOD AND SYSTEM FOR CONTROLLING DUAL-PROCESSING OF SCREEN DATA IN MOBILE TERMINAL HAVING PROJECTOR FUNCTION

CLAIMS OF PRIORITY

This application claims the benefit of priority from an application entitled "METHOD AND SYSTEM FOR CONTROLLING DUAL-PROCESSING OF SCREEN DATA IN MOBILE TERMINAL HAVING PROJECTOR FUNCTION" filed in the Korean Intellectual Property Office on Feb. 5, 2009 and Feb. 26, 2009 and assigned Serial No. 10-2009-0009493 and 10-2009-0016468, the contents of which are incorporated herein by reference in their entirety.

BACKGROUND OF THE INVENTION

1. Field of the Invention

The present invention relates generally to a mobile terminal having a projector to display images. More particularly, the present invention relates to a method of controlling dual-processing of screen data in a mobile terminal having a projector, and an apparatus for performing the same.

2. Description of the Related Art

Recently, with development of digital technologies, various mobile terminals capable of performing mobile communications and information processing, such as mobile communication terminals, personal digital assistants (PDA), electronic organizers have a growing presence in the market. The mobile terminal generally displays screen data on a display unit that is provided in the mobile terminal. However, since the mobile terminal has a limited size, and consumers typically prefer small devices for portability reasons, the display unit of the mobile terminal is small too.

Accordingly, a user of the mobile terminal may view information displayed on the small-sized display unit of the mobile terminal but has difficulty showing other people the information. Recently, in order to solve these drawbacks, a function of displaying information of a mobile terminal on a large-sized external display device such that a crowd of people may watch the information, such as "TV-OUT" function is being developed, but, in this case, an extra large-sized display device must be provided. The extra display is contrary to consumer demands for increased portability and extended battery life. Typically a conventional mobile terminal displays screen data on a small display unit that is a fraction of its overall size. In general, liquid crystal display (LCD) organic light emitting diode (OLED) are mainly employed as a display unit of the mobile terminal.

However, in the method of displaying screen data on the display unit of the mobile terminal, a very small screen in which the screen data are displayed on the display unit discomforts viewers who watch the screen data. If there are a number of viewers it becomes increasingly difficult to view the small screen at less than optimum vantage points. Thus, there is a need to provide a sufficient-sized screen in order to satisfy users who are, for example, playing games or watching digital broadcasting.

To this end, there have been various attempts are being carried out to provide a projector function to a mobile terminal so as to enjoy a larger screen. For example, research has been conducted for a mobile terminal having a projector module to provide a large scale screen using a wall or floor as an external screen.

The mobile terminal having a projector module may output screen data, which are used to be output to a display unit of the mobile terminal, directly to an external screen through the projector module. However, when the screen data are output to the display unit of the mobile terminal and the external screen through the projector module, operative actions of a user for the control of the screen data are directly displayed on the external screen so that the user's view of field must be obscured.

For example, when manipulating a mobile terminal to control a reproduction function thereof for reproduction of multimedia data such as moving picture data, operative actions according to the manipulations are immediately displayed on the external screen. Particularly, when the mobile terminal is manipulated to control a specific function during performance of presentation, user activities are directly applied onto the presentation screen so that the presentation is interfered with by the user activities.

SUMMARY OF THE INVENTION

The present invention provides a method of dualizing and individually outputting screen data to be displayed on a display unit of a mobile terminal and screen data to be displayed on an external screen by a projector function from a mobile terminal having a projector function and an apparatus for performing the same.

The present invention also provides a method and apparatus for dualizing screen data for a mobile terminal and screen data for an external screen, and for outputting different screen data to the mobile terminal and the external screen when the screen data are output to the external screen using a projector module from the mobile terminal having a projector function such that the screen data of the external screen may be controlled by the screen data for the mobile terminal.

In accordance with exemplary aspects of the present invention, there is provided a method of outputting screen data in a mobile terminal having a projector function, the method including: activating a projector module that performs the projector function; generating screen data for a display on a display unit of the mobile terminal and screen data for a projection output by the projector module; and performing dual-processing of the generated screen data and outputting the dual-processed screen data to each of the display unit and the projector module.

In accords with the present invention, the respective screen data include screen data for a display on a display unit and screen data for a projector for display on an external screen through a projector module. The screen data for the display unit and the screen data for the projector module are output as common screen data or dual-processed screen data.

Preferably, the common screen data and the dual-processed screen data are provided to the display unit and the projector module in a time division method.

The present invention also provides a screen data outputting system of a mobile terminal preferably including: a processing module performing dual-processing of screen data into screen data for a display unit and screen data for a projector module to generate two screen data when a projector function is performed; a module outputting the screen data to the display unit and the screen data to the projector module as common screen data or dual-processed screen data according to an executed function; a display module displaying the screen data for a display of the common screen data or the dual-processed screen data; and a module outputting the screen data for the projector module of the common screen data or the dual-processed screen data to an external screen.

The common screen data include two screen data in which the screen data for the display unit have a same screen configuration as that of the screen data for the projector module, and the dual-processed screen data include two screen data in which the screen data for the display unit have screen configuration differs from that of the screen data for the projector module.

The screen data for a display unit of the dual-process screen data include a virtual item for functional control of the screen data for a projector of the dual-processed screen data, and the screen data for a projector of the dual-processed screen data are preferably an execution screen data corresponding to the performance of the mobile terminal and various information items set by a user.

Moreover, according to an exemplary aspect of the present invention, the screen data for a display unit and the screen data for a projector of the commons screen data and the dual-processed screen data are sequentially output in alternate fashion by a time-division method.

The present invention also provides a mobile terminal having a projector function, preferably including: a control unit generating screen data for a display unit targeting a display unit and screen data for a projector targeting a projector module when a projector function is activated; the display unit displaying the screen data for the display unit output from the control unit; and the projector module outputting the screen data for the projector function output from the control unit to an external screen.

The present invention also provides a screen data outputting apparatus of a mobile terminal, preferably including: a control unit for generating a respective screen data provided to a display unit and a projector module, performing dual-processing of the screen data, and outputting the dual-processed screen data in a time-division method; a storage unit for buffering the respective screen data provided to the display unit and the projector module; an LCD driver module extracting screen data targeting the display unit from the screen data buffered in the storage unit and for providing the extracted screen data to the display unit; the display unit displaying the screen data transmitted from the LCD driver module; and the projector module extracting screen data to be output to an external screen from the screen data buffered in the storage unit and outputting the extracted screen data to the external screen.

BRIEF DESCRIPTION OF THE DRAWINGS

The exemplary objects, features and advantages of the present invention will become more apparent from the following detailed description in conjunction with the accompanying drawings, in which.

DETAILED DESCRIPTION

Hereinafter, exemplary embodiments of the present invention are described in detail with reference to the accompanying drawings. The same reference symbols are used throughout the drawings to refer to the same or like parts. Detailed descriptions of well-known functions and structures incorporated herein may be omitted to avoid obscuring appreciation of the subject matter of the present invention by a person of ordinary skill in the art.

The present invention relates to a mobile terminal having a projector function. Specifically, in exemplary embodiments of the present invention, the present invention provides a method and system for dualizing screen data provided to a display unit of a mobile terminal and screen data provided to an external screen so as to display different respective screen data to the display unit and the external screen when the screen data are output to the external screen using a projector module of the mobile terminal.

The mobile terminal preferably includes the projector function, a reproducing function of multimedia data such as a moving picture, a music file, and the like, a digital broadcasting and reproducing function, a document viewer function, etc. During a performance of reproducing multimedia data, digital broadcasting and of the document viewer, the mobile terminal may enlarge screen data generated by the performance of the functions and may provide the enlarged screen data to an external screen, due to the projector function.

Hereinafter, in exemplary embodiments of the present invention, a case when screen data provided to a display unit of the mobile terminal are identical to screen data provided to the external screen through the projector module is referred to "an output of common screen data", and a case when screen data provided to the display unit of the mobile terminal are different from screen data provided to the external screen through the projector module is referred to "an output of dual-processed screen data".

A mobile terminal having a projector module according to an exemplary embodiment of the present invention and dual-processing of output screen data in the mobile terminal having a projector module will be described with reference to the accompanying drawings. However, since the mobile terminal according to an exemplary embodiment of the present invention and the dual-processing of the screen data are not limited to the following description, it should be noted that various modifications and changes are available from understanding of the following exemplary embodiments of the present invention.

Figure 1:
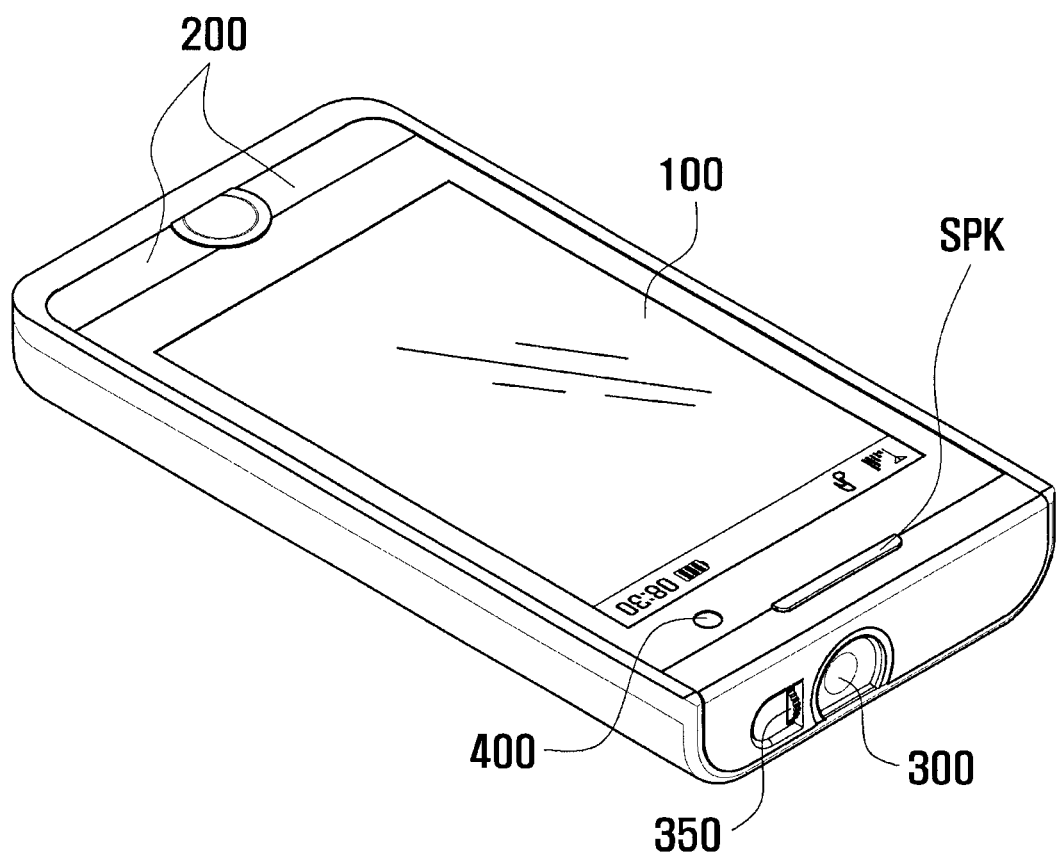
FIGS. 1 to 3 are schematic views illustrating examples of a mobile terminal according to an exemplary embodiment of the present invention.
Figure 2:
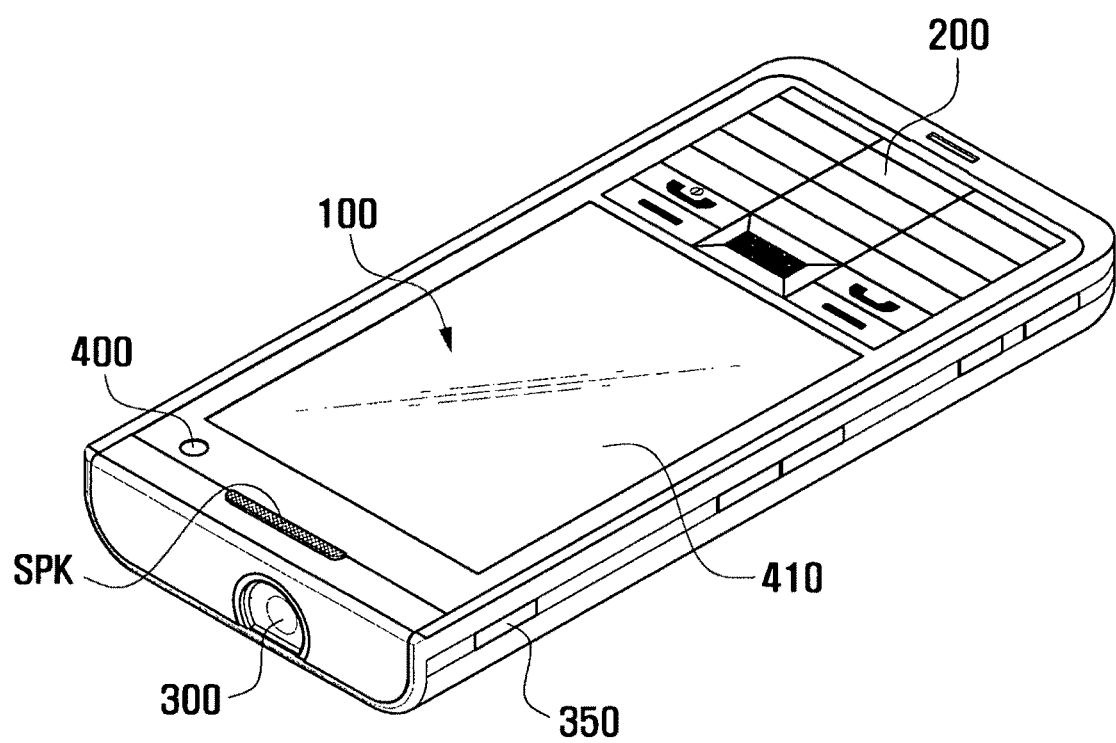
Figure 3:
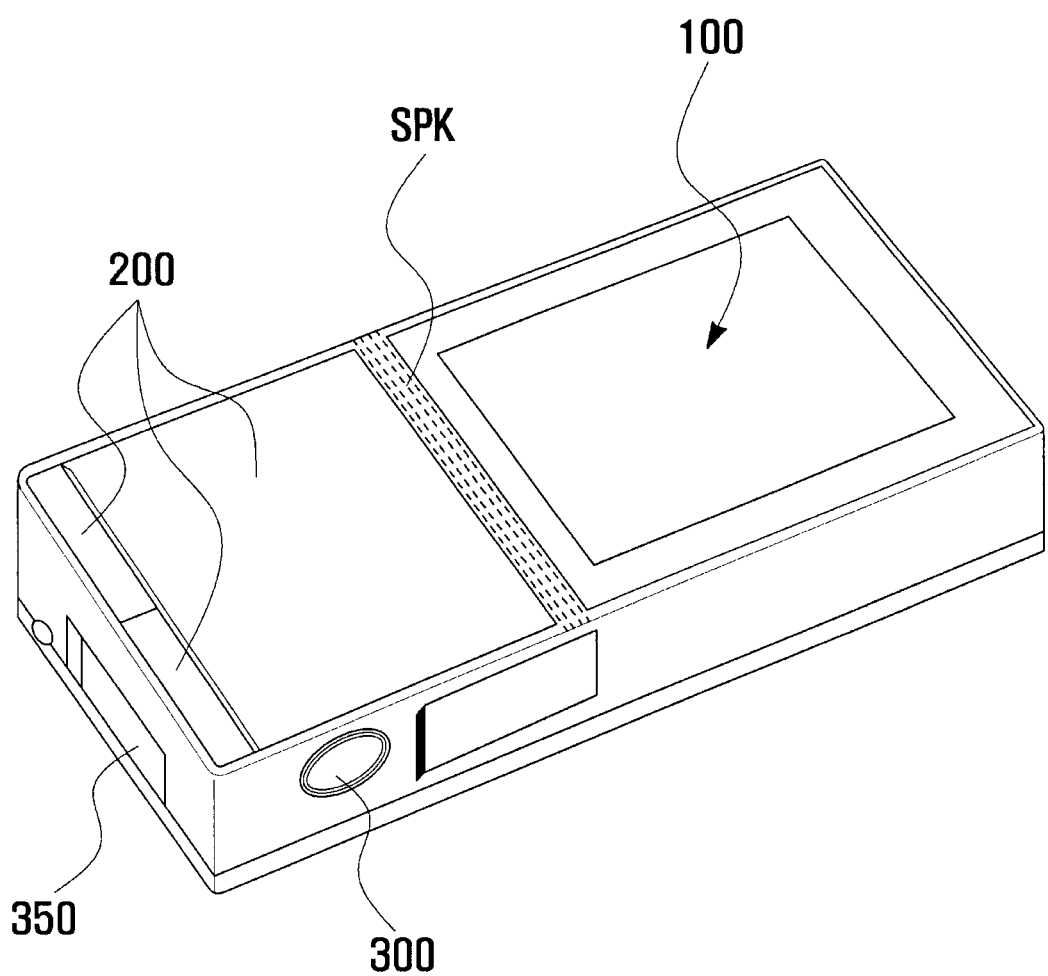

FIGS. 1 to 3 are schematic views illustrating examples of a mobile terminal according to an exemplary embodiment of the present invention. More particularly, FIGS. 1 to 3 are views illustrating types of a mobile terminal having a projector module.

Referring now to FIGS. 1 to 3, FIG. 1 shows an exemplary embodiment of the present invention of a mobile terminal in which a full touch screen having input and output functions is installed on overall front side thereof, FIG. 2 shows a bar type mobile terminal in which an input unit is separated from a display unit, and FIG. 3 shows a mobile terminal in which a touch screen is coupled with a touch pad.

The mobile terminal includes a display unit 100 outputting various screen data generated when any function of the mobile terminal is performed, an input unit 200 to which a user control signal is input, a projector module 300 for enlarging screen data transmitted from the mobile terminal and for projecting the enlarged screen data to an external screen, a focus controller 350 for performing focus control of the projector module 300, and a speaker SPK for outputting various audio data generated when any function of the mobile terminal is performed. The person of ordinary skill in the art should understand and appreciate that the mobile terminal and its operations are not limited to use of the touch screen. A display unit of an LCD or OLED separated from an input unit of a keypad and/or a touch pad, and the mobile terminal may be operated by combination of the display unit and the input unit is one of many variations within the spirit and scope of the claimed invention.

The mobile terminal may include, for example, a front camera module 400 for video communications, a camera module (not shown) for photographing a picture of a subject, and a broadcasting receiver module (not shown) receiving and reproducing digital broadcasting.

Hereinafter, internal configuration of the mobile terminal, as illustrated in FIGS. 1 to 3, for controlling dualization of the screen data will be described with reference to FIG. 4. Since the configuration of the mobile terminal is not limited to the following description, it should be noted that various modifications and changes may be made based on the following exemplary embodiments of the present invention.

Thus, the mobile terminal according to an exemplary embodiment of the present invention may include any mobile communication terminal that is operated under communication protocol corresponding to various communication systems, a portable projector module, an information communication device, a multimedia device, and an application thereof, such as a portable multimedia player (PMP) having a projector module, a digital broadcasting player, a personal digital assistant (PDA), a portable game terminal, a smart phone, and the like, just to name a few possibilities. Now, schematic configuration of the mobile terminal according to an exemplary embodiment of the present invention will be described with reference to FIG. 4.

Figure 4:
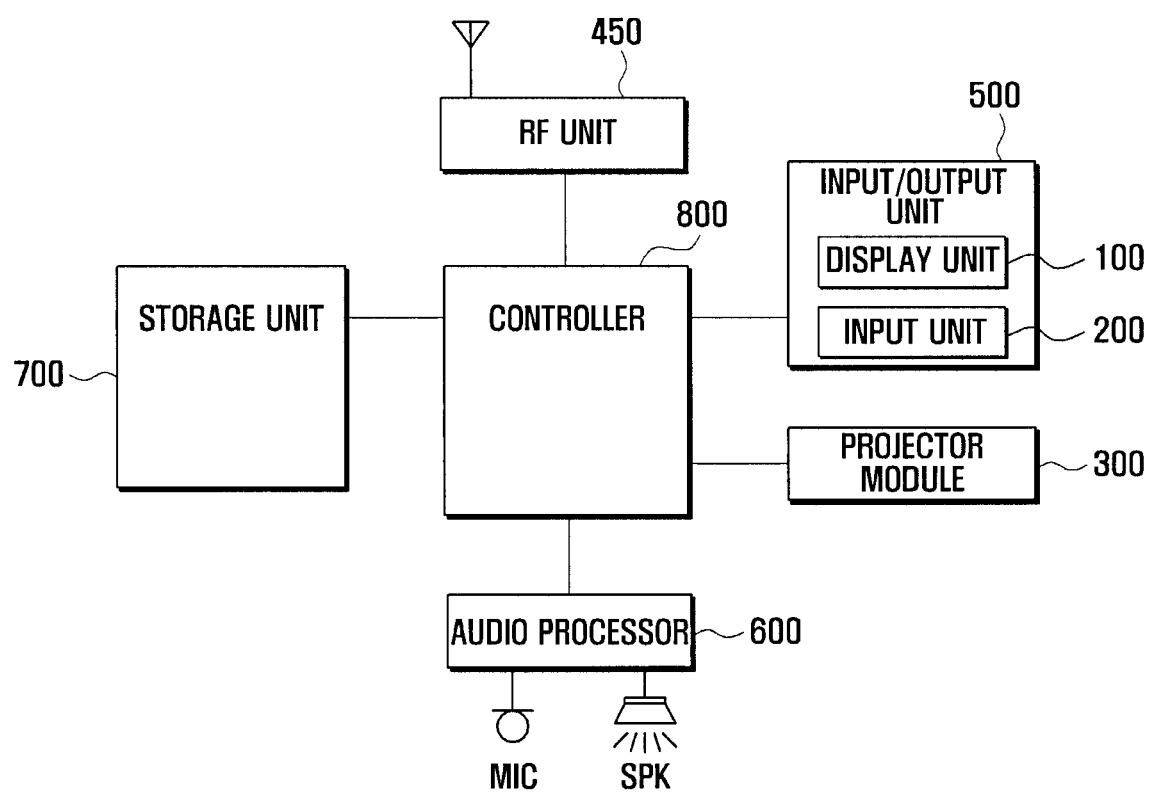
FIG. 4 is a block diagram illustrating one possible configuration of a mobile terminal according to an exemplary embodiment of the present invention.

FIG. 4 is a block diagram illustrating configuration of a mobile terminal according to an exemplary embodiment of the present invention. In FIG. 4, although a mobile communication terminal supporting mobile communication service will be described, the claimed invention is not limited to the mobile communication terminal shown herein.

Referring now to FIGS. 1 to 4, a mobile terminal according to an exemplary embodiment of the present invention preferably includes a radio frequency (RF) unit 450, an input and output unit 500, an audio processor 600, a storage unit 700, a projector module 300, and a controller 800. The input and output unit 500 includes a display unit 100 and an input unit 200. The display unit 100 may be a liquid crystal display (LCD), an organic light emitting diode (OLED), or a touch screen. The input unit 200 may be at least one of a touch pad, a keypad, a dome key, a function key, and combination thereof. The mobile terminal, as illustrated in FIGS. 1 to 3, may further include, for example, a focus controller 350 for focus controlling of the projector module 300.

With reference to FIG. 4, the RF unit 450 performs communications for the mobile terminal. For example, the RF unit 450 establishes a communication channel through a supportable mobile communication network and performs communications such as voice calls, video telephony calls, and data calls. The RF unit 450 may include an RF transmitter performing and amplifying up-conversion of frequency of a signal to be transmitted and an RF receiver amplifying a received signal and performing down-conversion of frequency of the received signal. The RF unit 450 may even be omitted according to the type of the mobile terminal of the exemplary embodiment of the present invention.

The input and output unit 500 may include the display unit 100 and the input unit 200. The input and output unit 500 may include only the display unit 100 according to the mobile terminal. In this case, the display unit 100 may preferably comprise a touch screen. The touch screen is an input and output device performing an inputting function and a displaying function, particularly in this exemplary embodiment, includes a display region such as LCD or OLED and a touch region formed by a touch sensor.

The display region of the touch screen displays various screen data generated during performance of functions of the mobile terminal and status information generated by user manipulations and function settings. In other words, the display region may display various screen data relating to a plurality of statuses and operations of the mobile terminal. The display region displays various signals and color information which are output from the controller 800 visually. The display region may display screen data generated from the controller 800 and screen data of a specific graphical user interface (GUI) for functional control, during the performance of a projector function of the mobile terminal. That is, the display region displays one of common screen data and dual-processed screen data that are generated by the controller 800 during the performance of the projector function of the mobile terminal. The dual-processed screen data provided through the display region display a virtual item varying in response to an executive application as GUI.

With regard to operation, the touch region receives an input event from a user. The touch region receives a tap event, a drag event, a flick event, and a sweep event for function control when the executive application of the mobile terminal is executed. The touch region transmits information on coordinates where the input event occurs to the controller 800 when the input event is input from the user. That is, the touch region detects a touch generated by the user, generates a signal of the detected touch, and transmits the signal to the controller 800.

The input unit 200 typically receives various text information and transmits signals relating to various function settings and the function control of the mobile terminal to the controller 800. For example, the input unit 200 generates an input signal in response to user action and may include at least one of an input device such as a keypad, a function key, a dome key, and a touch pad for the generation of signal. In this exemplary embodiment of the present invention, the input unit 200 may be omitted according to a type of a mobile terminal.

With continued reference to FIG. 4, the audio processor 600 is connected to a microphone MIC and the speaker SPK, converts a voice signal input from the microphone MIC into data to provide the same to the controller 800, and outputs the voice signal input from the controller 800 to the speaker SPK. That is, the audio processor 600 converts an analog voice signal input from the microphone MIC into a digital voice signal and a digital voice signal input from the controller 800 into an analog voice signal. The audio processor 600 may reproduce various audio components generated by the mobile terminal, such as audio data generated during reproduction of a moving picture and music file by user selection. The voice signal processing of the audio processor 600 may be omitted according to a type of a mobile terminal in accordance with an exemplary embodiment of the present invention.

The storage unit 700 may include a read only memory (ROM) and a random access memory (RAM) and is not limited to any particular type of storage. The storage unit 700 may store various data generated by and used in the mobile terminal. The data include generated by execution of an application of the mobile terminal and storable data generated by the mobile terminal or received from an external device such as a base station, a counterparty mobile terminal, a personal computer, etc. The data may include user interface provided by the mobile terminal, various setting information for use of the mobile terminal, virtual items set to control the projector function during the performance of the projector function, multimedia data such as a moving picture and music file, and setting information for control of the projector function.

The storage unit 700 may, for example, store an application for controlling general operation of the mobile terminal and an application for controlling output of the screen data through dual-processing of the screen data. The applications may be applications for executing operation corresponding to operations as illustrated in FIGS. 1 to 4 and for operations described later with following drawings. The applications may be stored in an application storing region (not shown) of the storage unit 700. The storage unit 700 may include at least one buffer to temporally store data generated during the execution of the applications and the performance of the mobile terminal.

The projector module 300 preferably comprises a device, which is installed in the mobile terminal to enlarge various screen data provided from the controller 800 and to output the enlarged various screen data to the external screen through a lens. In other words, the projector module 300 projects various screen data processed by the controller 800 upon the external screen without distortion.

The controller 800 preferably performs an overall control function of the mobile terminal and controls signal flows between the above-mentioned functional blocks of the mobile terminal. For example, the controller 800 controls the signal flows between the respective components such as the RF unit 450, the input and output unit 500, the audio processor 600, the storage unit 700, and the projector module 300.

In particular, the controller 800 processes the screen data output through the display unit 100 and the screen data output through the projector module 300 during the performance of the projector function. The controller 800 dual-processes the screen data transmitted to the projector module 300 typically into one of common screen data in response to the execution application or dual-processed screen data. After that, the controller 800 controls the screen data by transmitting the dual-processed common screen data or the dual-processed screen data to the display unit 100 and the projector module 300.

In other words, the controller 800 outputs the common screen data to the display unit 100 and the projector module 300 according to the screen data generated by execution of the application or outputs the dual-processed screen data to the display unit 100 and the projector module 300.

The controller 800 may control overall operations that have been described with reference to FIGS. 1 to 4 and operations additional described with reference to the following drawings. The functional control by the controller 800 can be implemented, for example, into software for processing the above-mentioned operations. Accordingly, detailed operations of the controller 800 will be described subsequently.

Meanwhile, FIGS. 1 to 17 show schematic configurations of the mobile terminal only for illustrative purposes, and the presently claimed invention is not limited to the schematic configurations shown herein.

The controller 800 may further include a baseband module for mobile communication service of the mobile terminal. The baseband module may be provided in the controller 800 and the RF unit 450 or may be separated from the controller 800 and the RF unit 450.

Although not depicted in FIGS. 1 to 4, the mobile terminal may include a plurality of modules included but limited to a camera module to acquire image data of a subject by photographing the subject, a near field communication (NFC) module, and an Internet communication module for communicating with Internet network to perform Internet function.

Figure 5:
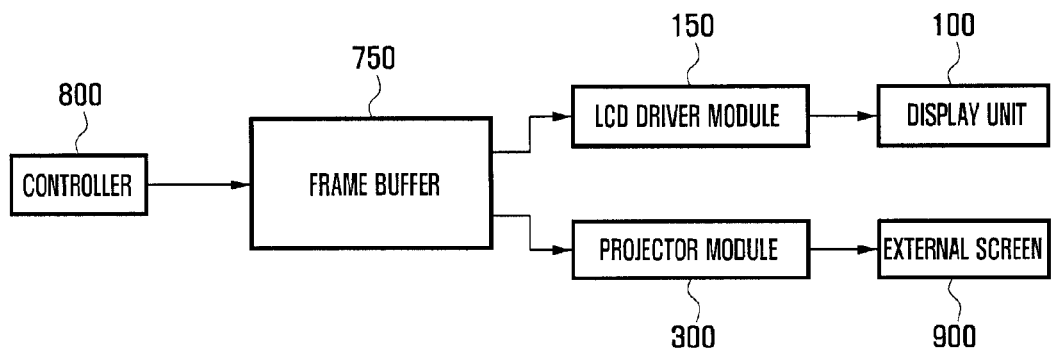
FIGS. 5 and 6 are schematic block diagrams for dual-processing of screen data output from a mobile terminal having a projector function according to an exemplary embodiment of the present invention.
Figure 6:
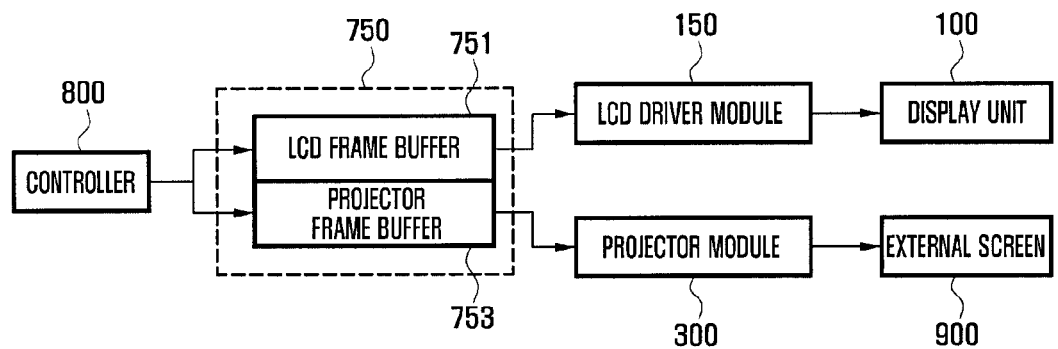

FIGS. 5 and 6 are schematic block diagrams of components for dual-processing screen data output from a mobile terminal having a projector function according to an exemplary embodiment of the present invention.

As illustrated in FIGS. 5 and 6, an apparatus for dualizing screen data in a mobile terminal having a projector function preferably includes a mobile terminal having a controller 800, a frame buffer 750, an LCD driver module 150, a display unit 100, and a projector module 300, and an external screen 900 to display screen data projected through the projector module 300 from the mobile terminal.

The frame buffer 750 may comprise a dual-port RAM (DPRAM) performing inter-process communication for data sharing. The frame buffer 750 operates to buffer the common screen data, or the dual-processed screen data, that is transmitted by the controller 800 and an output of the frame buffer 750 includes respective screen data that is transmitted to the LCD driver module 150 or the projector module 300. In this case, the frame buffer 750 may comprise a single unit as illustrated in FIG. 5, or may be comprise an LCD frame buffer 751 and a projector frame buffer 753, for example, as illustrated in FIG. 6.

Referring now to FIGS. 4 to 6, a user may activate the projector function of the mobile terminal using an input unit provided in the mobile terminal. Then, the controller 800 drives the projector module 300 in response to the activation of the projector function. In this case, it is assumed that the mobile terminal is displaying specific screen data corresponding to user demands on the display unit 100.

The controller 800 generates information displayed on the display unit 100, that is, screen data identical to the specific screen data, and transmits the generated screen data to the projector module 300. Hereinafter, the identical screen data provided to the display unit 100. as well as to the external screen 900, are referred to common screen data. The common screen data indicate two identical screen data having identical screen configurations. In other words, the common screen data are preferably divided into screen data provided to the LCD driver module 150 and screen data provided to the projector module 300.

Next, when the common screen data are output to the display unit 100 and the external screen 900 through the LCD driver module 150 and the projector module 300 respectively, a user may manipulate a specific object of the screen data provided to the display unit 100 using the display unit 100 or the input unit 200. The term "object" refers to an icon of content to execute a specific application such as a moving picture or digital broadcasting player, an image viewer, and a text viewer, and an icon to enter a specific menu.

Thus, according to this exemplary embodiment of the present invention, when a user control request for the object is generated, the controller 800 may detect the user control request as an execution command for executing a specific function corresponding to the object.

When the execution command is detected, dual-processing operation can be performed wherein the controller 800 controls the screen data being transmitted to the projector module 300 to be different from the screen data transmitted to the display unit 100. In other words, the controller 800 generates the screen data displayed on the display unit 100 and the screen data output to the external screen 900 through the projector module 300, that is, dual-processes the screen data. Hereinafter, the respective different screen data provided to the display unit 100 and the external screen 900 are referred to as dual-processed screen data.

The dual-processed screen data indicate two screen data have different screen configurations. That is, the dual-processed screen data are divided into screen data provided to the LCD driver module 150 and screen data provided to the projector module 300.

The screen data, of the dual-processed screen data, provided to the projector module 300 (hereinafter, referred to 'screen data for a projector') may be screen data corresponding to the execution of a function mapped to the object. That is, the projector screen data is screen data of a specific application executed by a user execution command to the object and indicate moving picture screen data, image screen data, and document screen data (hereinafter, referred to 'screen data for presentation').

The screen data, of the dual-processed screen data, provided to the LCD driver module 150 (hereinafter, referred to 'screen data for a display unit') are screen data to manage the screen data for a projector displayed on the external screen 900 through the projector module 300, that is, screen data for controlling a function corresponding to the screen data for a projector, and indicate screen data having virtual items corresponding to an execution application (GUI screen data). Examples of the dual-processed screen data are illustrated in the following drawings.

In details of the above-mentioned operations, when the projector function is activated, the controller 800 generates screen data having a screen configuration corresponding to a user request, such as a menu screen, a list screen, and a specific application execution screen and transmits the generated screen data to the frame buffer 750. In other words, the controller 800 generates screen data having the same screen configuration as that of screen data provided to the display unit 100 (screen data for a display unit). That is, the controller 800 generates screen data provided through the projector module 300 (screen data for a projector), and dual-processes the screen data for a display unit and the screen data for a projector, that is, the common screen data and transmits the common screen data to the frame buffer 750.

In the early stage, a case when the common screen data are provided has been described. According to an application executed in the mobile terminal during the activation of the projector function or an execution mode at a time point of the mobile terminal, the dual-processing for outputting the dual-processed screen data (not the common screen data) may be immediately performed. The dual-processing of the dual-processed screen data will be described later.

In this particular case, the common screen data transmitted to the frame buffer 750 may include identical screen configuration and the screen data for a projector and the screen data for a display unit. Therefore, the common screen data may include screen data displayed on the display unit 100 (screen data for a display unit) and screen data displayed on the external screen 900 through the projector module 300 (screen data for a projector).

With continued reference to FIG. 6, when the frame buffer 750, includes the LCD frame buffer 751 and the projector frame buffer 753, the screen data for a display unit of the common screen data may be transmitted to the LCD frame buffer 751 and the screen data for a projector of the common screen data may be transmitted to the projector frame buffer 753.

The controller 800 may use, for example, the data bus when the common screen data are transmitted to the frame buffer 750. The controller 800 may use a time-division technology to transmit the common screen data to the LCD driver module 150 and the projector module 300, that is, corresponding targets, simultaneously. In other words, the controller 800 may transmit the common screen data (screen data for a display unit and screen data for a projector) to the LCD driver module 150 and the projector module 300 in a sequential alternate manner.

The LCD driver module 150 (shown in FIG. 6) transmits the common screen data stored in the frame buffer 750 to the display unit 100. In this case, the LCD driver module 150 transmits the screen data for a display unit of the common screen data from the frame buffer 750 to the display unit 100. When the frame buffer 750 is divided, for example, into the LCD frame buffer 751 and the projector frame buffer 753, the LCD driver module 150 transmits the common screen data stored in the LCD frame buffer 751 to the display unit 100.

The display unit 100 displays the common screen data transmitted from the LCD driver module 150. In this case, the displayed common screen data have the same screen configuration as that of the common screen data displayed on the external screen 900. Examples of the common screen data will be described later.

The projector module 300 outputs the common screen data stored in the frame buffer 750 to the external screen 900. The projector module 300 outputs the screen data for a projector of the common screen data from the frame buffer 750 to the external screen 900. When the frame buffer 750 is divided into the LCD frame buffer 751 and the projector frame buffer 753, the projector module 300 outputs the common screen data stored in the projector frame buffer 753 to the external screen 900.

The external screen 900 displays the common screen data transmitted from the projector module 300. The external screen 900 may adopt a component of a specific device such as a white screen, and may double as an object in the room such as a wall or a floor. Thus, a person of ordinary skill in the art should understand and appreciate that the external screen 900 is not built in the mobile terminal of the present invention, but indicates any object on to which the screen data are projected by the projector module 300.

When an execution command of a specific object is created by a user while the projector module 300 is driven to display the common screen data on the display unit 100 and the external screen 900, the controller 800 generates dual-processed screen data corresponding to the execution command. The dual-processed screen data refers to the screen data for a projector and the screen data for a display unit, having different screen configurations.

The screen data for a projector may comprise execution screen data of an application corresponding to an object onto which the execution command is created, and the screen data for a display unit may be GUI screen data for controlling a function corresponding to the screen data for a projector, that is, corresponding to the execution application.

When the execution command is transmitted, the controller 800 can generates the dual-processed screen data corresponding to the execution application and transmits the screen data to the frame buffer 750. In such a case, the controller 800 creates screen data for controlling a function corresponding to the execution application to be displayed on the display unit 100, that is, the screen data for a display unit (GUI screen data) and execution screen data corresponding to the execution application to be displayed on the external screen 900 through the projector module 300, that is, the screen data for a projector, respectively and dual-processes the screen data for a display unit and the screen data for a projector, that is, the dual-processed screen data to transmit the dual-processed screen data to the frame buffer 750.

The dual-processed screen data transmitted to the frame buffer 750 have different screen configurations and two different dual-processed screen data (screen data for a projector and screen data for a display unit) that may be transmitted to the frame buffer 750. In other words, the dual-processed screen data may include screen data for a projector (execution screen data) to be displayed on the external screen 900 by the execution command and screen data for a display unit (GUI screen data) having virtual items for functional control of an application to be executed in response to the execution command and to be displayed on the display unit 100.

In a case where the frame buffer 750, as illustrated in FIG. 6, is divided into, for example, the LCD frame buffer 751 and the projector frame buffer 753, the screen data for a display unit (GUI screen data) of the dual-processed screen data may be transmitted to the LCD frame buffer 751 and the screen data for a projector (execution screen data) of the dual-processed screen data may be transmitted to the projector frame buffer 753.

Meanwhile, the 800 may use data bus when the dual-processed screen data are transmitted to the frame buffer 750. The controller 800 may use time division technology to transmit the dual-processed screen data to the LCD driver module 150 and the projector module 300, that is, corresponding targets, simultaneously. In other words, the controller 800 may transmit corresponding dual-processed screen data (screen data for a display unit and screen data for a projector) to the LCD driver module 150 and the projector module 300, respectively, using the time division technology in a sequential alternate manner.

The LCD driver module 150 transmits the dual-processed screen data stored in the frame buffer 750 to the display unit 100. In this case, the LCD driver module 150 preferably transmits the screen data for a display unit of the dual-processed screen data from the frame buffer 750 to the display unit 100. When the frame buffer 750 is divided into the LCD frame buffer 751 and the projector frame buffer 753, the LCD driver module 150 transmits the dual-processed screen data stored in the LCD frame buffer 751 to the display unit 100.

The display unit 100 displays the dual-processed screen data transmitted from the LCD driver module 150. In this case, the displaying dual-processed screen data, that is, the screen data for a display unit have a screen configuration that is different from that of the dual-processed screen data displayed on the external screen 900. In other words, the screen data for a projector (execution screen data), may have screen configuration have virtual items for substantially controlling the screen data for a projector. These screen data will be described later.

The projector module 300 outputs the dual-processed screen data stored in the frame buffer 750 to the external screen 900. The projector module 300 outputs the screen data for a projector of the dual-processed screen data from the frame buffer 750 to the external screen 900. When the frame buffer 750 is divided into the LCD frame buffer 751 and the projector frame buffer 753, the projector module 300 outputs the dual-processed screen data stored in the projector frame buffer 753 to the external screen 900.

The external screen 900 displays the dual-processed screen data transmitted from the projector module 300. The dual-processed screen data displayed on the external screen 900, that is, the screen data for a projector have screen configuration different from the dual-processed screen data displayed on the display unit 100, that is, the screen data for a display unit, and include execution screen data (presentation screen data such as moving picture reproducing screen data, image reproducing screen data, digital broadcasting reproducing screen data, and text screen data) corresponding to an execution application. The execution screen data, that is, the screen data for a projector may be modified by a control command input through the screen data for a display unit. These screen data will be described later.

Hereinbefore, the screen data dual-processing in a mobile terminal having a projector module according to an exemplary embodiment of the present invention and the apparatus for performing the same have been described. Hereinafter, a dual-processing method of screen data in a mobile terminal will be described. However, operations of the mobile terminal according to an exemplary embodiment of the present invention are not limited to the following description, but the following various exemplary embodiments of the present invention may be applied to the mobile terminal.

Figure 7:
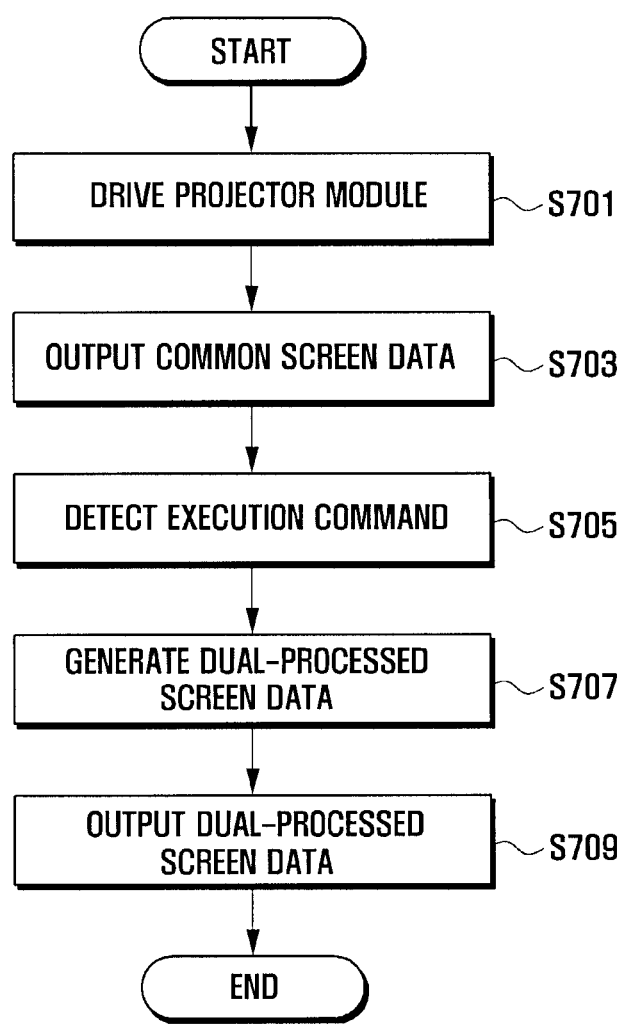
FIG. 7 is a flowchart for a dual-processing method of screen data in a mobile terminal having a projector function according to an exemplary embodiment of the present invention.

FIG. 7 is a flowchart for a dual-processing method of screen data in a mobile terminal having a projector function according to an exemplary embodiment of the present invention.

Referring now to FIGS. 1 to 7, at step (701) a mobile terminal drives a projector module 300 in response to a request for a projection function from a user. That is, the user may activate the projector function installed in the mobile terminal using an input unit such as a specific button or key. The projector function can be activated nu a user by entering a specific menu. In this case, it is assumed that the mobile terminal displays specific screen data corresponding to the user request on the display unit 100 before the activation of the projector function.

Next, at step (703), when the projector module 300 is driven, the mobile terminal generates the screen data having the same screen configuration as screen data displayed on the display unit 100 and provides the screen data to the projector module 300. In other words, the mobile terminal generates screen data to be provided to the display unit 100 (screen data for a display unit) and screen data to be provided to the projector module 300 (screen data for a projector) as the common screen data, and outputs dual-processed common screen data to the display unit 100 and the projector module 300.

The mobile terminal outputs the screen data (screen data for a projector) identical to the screen data displayed on the display unit 100 (screen data for a display) to the external screen 900 through the projector module 300 (S703). In other words, the mobile terminal outputs the screen data currently displayed on the display unit 100 as the screen data for a projector to the projector module 300 (S703). In this step, the mobile terminal may use time division technology to transmit screen data to the LCD driver module 150 and the projector module 300 in order to output simultaneously the screen data to the display unit 100 and the external screen 900 through the projector module 300.

Although the case where the common screen data are provided in the early stage has been described with reference to FIG. 7, the dual-processing may be directly performed for the output of the dual-processed screen data not the common screen data according to an application executed in the mobile terminal or a execution mode at a corresponding time point of the mobile terminal when the projector mode is activated.

Next, at step (705), the mobile terminal may detect an execution command by a specific object from a user while displaying the common screen data on the display unit 100 and the external screen 900 when the projector module 300 is driven as described above (S705). That is, a user may select a specific object to be executed from objects included in the screen data displayed on the display unit 100 so as to control execution of the selected specific object. In this case, the mobile terminal may keep on providing operating status of the user execution control as identical screen data to the display unit 100 and the external screen 900.

At step (707), the mobile terminal generates dual-processed screen data corresponding to the execution command when the execution commands is detected. The dualized screen data refer to screen data for a projector and screen data for a display unit, having different screen configurations. That is, the mobile terminal generates screen data for a projector to be transmitted to the projector module 300 and screen data for a display unit to be transmitted to the display unit 100. In this case, the screen data for a projector may comprise execution screen data of an application corresponding to an object where the execution command is generated and the screen data for a display unit may be screen data corresponding to the screen data for a projector, that is, screen data for function control corresponding to the execution application.

For example, the screen data for a projector may be presentation screen data such as moving picture reproducing screen data, digital broadcasting reproducing screen data, image reproducing screen data, and document screen data, and the screen data for a display unit may be screen data for function control of the presentation screen data, such as screen data for controlling reproducing function of reproducing a moving picture, screen data for controlling reproducing function of digital broadcasting, screen data showing image lists such as still pictures, and screen data for controlling change of pages and presentation function.

At step (S709), the mobile terminal generates the screen data for a display unit corresponding to an execution application to be displayed on the display unit 100 and the screen data for a projector corresponding to an execution application to be displayed on the external screen 900 through the projector module 300, dual-processes the screen data for a display unit and the screen data for a projector, that is, the dual-processed screen data to output the dual-processed screen data to the display unit 100 and the projector module 300, respectively. The mobile terminal outputs the screen data for a projector to the external screen 900 through the projector module 300 and displays the screen data for a display unit in which control related to the screen data for a projector may be executed on the display unit 100.

After that, the mobile terminal may perform controls related to functions of the screen data for a projector output to the external screen 900 through the projector module 300 in response to user control using the screen data for a display unit provided from the display unit 100. The control using the dual-processed screen data will be described later.

Figure 8:
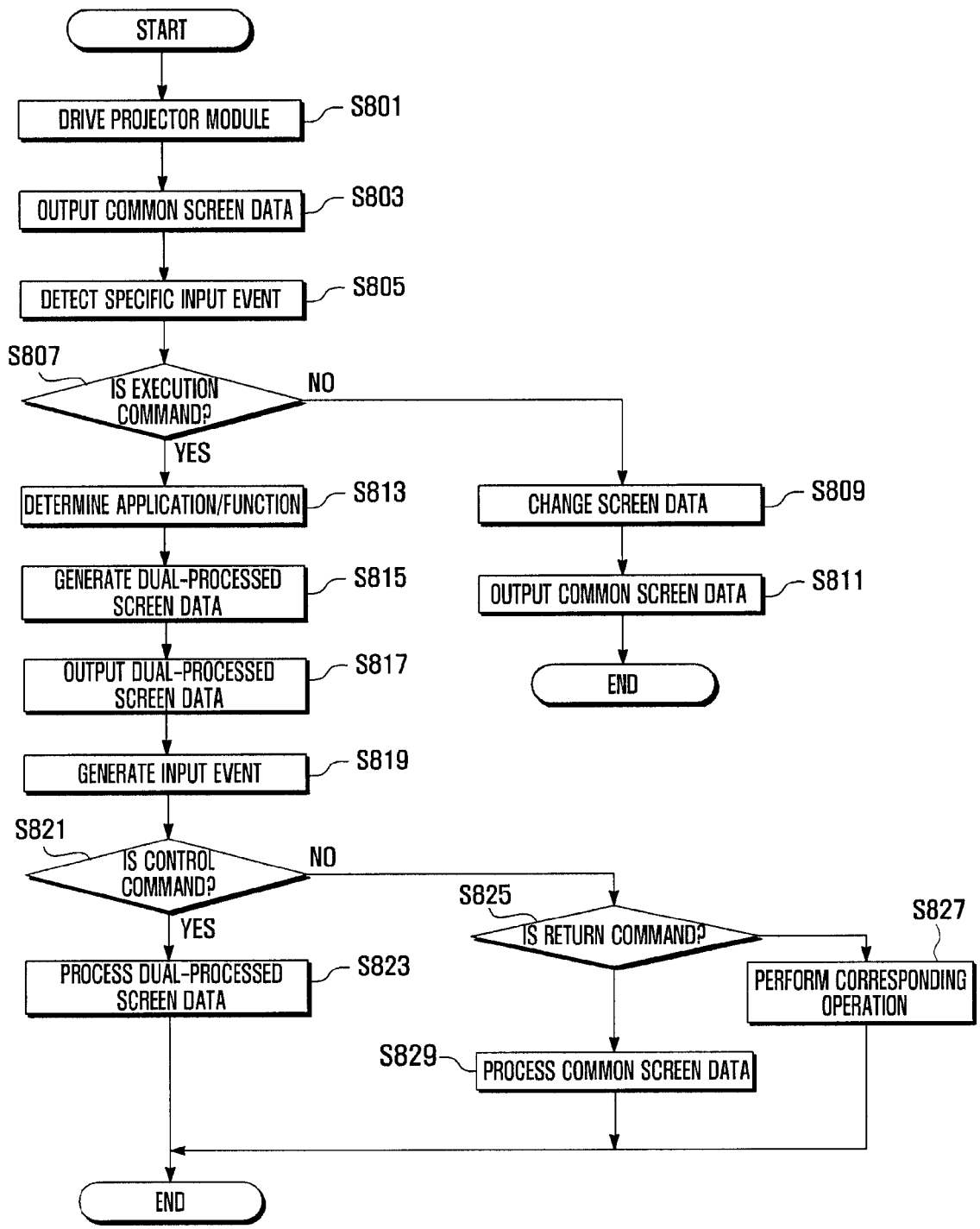
FIG. 8 is a flowchart illustrating a method of displaying screen data which are dual-processed by a mobile terminal having a projector function according to an exemplary embodiment of the present invention.

FIG. 8 is a flowchart illustrating a method of displaying screen data which are dual-processed by a mobile terminal having a projector function according to an exemplary embodiment of the present invention.

Referring now to FIGS. 1 to 8, at step (801) the mobile terminal drives the projector module 300 in response to user request for activation of a projector function.

At step (803), the mobile terminal generates the common screen data when the projector module 300 is driven and outputs the generated common screen data to the display unit 10 and the projector module 300 respectively. That is, the mobile terminal preferably generates screen data to be provided to the display unit 100 (screen data for a display unit) and screen data to be provided to the projector module 300 (screen data for a projector) and dual-processes the common screen data to output the dual-processed screen data to the display unit 100 and the projector module 300.

FIG. 8 is particularly applicable in a case where the common screen data are provided to the display unit 100 and the projector module 300 when the projector module 300 is driven. In this case, the dual-processed screen data may be provided to the display unit 100 and the projector module 300 according to an application being executed in the mobile terminal or an execution mode of the mobile terminal at a corresponding time point when the projector module 300 is driven.

At step (805) the mobile terminal may detect a specific input event generated by a user while the common screen data are provided to the display unit 100 and the projector module 300 when the project module 300 is driven.

At step (807), when the input event is detected, the mobile terminal determines whether the input event is an application of a specific object or a function execution command.

However, when at step (807) the input event is not an execution command, at step (809) the mobile terminal changes screen data in response to the input event, and outputs the common screen data to the display unit 100 and the projector module 300. For example, the mobile terminal generates screen data for a display unit and screen data for a projector, corresponding to the input event and dual-processes the generated screen data, that is, the common screen data to provide the same to the display unit 100 and the projector module 300. The screen data for a display unit and the screen data for a projector have identical screen configuration.

When at step (807) the input event is an execution command, the mobile terminal determines an application/function mapped to a corresponding object where the execution command is generated (S813) and generates execution screen data corresponding to the application/function, that is, the screen data for a projector and screen data for functional control corresponding to the screen data for a projector, that is, the screen data for a display unit (S815).

That is, the mobile terminal generates dual-processed screen data corresponding to the execution application/function of the corresponding object according to the execution command.

Then, the mobile terminal dual-processes the respective generated screen data, that is, the dual-processed screen data at step (817) is outputs as dual-processed screen data to the display unit 100 and the projector module 300. In this case, the screen data for a projector have screen configuration different from the screen data for a display unit.

At step (819), the mobile terminal may detect a specific input event generated by a user while the dual-processed screen data are provided to the display unit 100 and the projector module 300 (S819). Next, at step (821), when the input event is detected, the mobile terminal determines whether the input event is a control command for functional control.

When the input event is a control command, at step (823) the mobile terminal processes the dual-processed screen data according to the control command. When the control command is generated, the mobile terminal processes a function on the screen data for a projector provided to the projector module 300 and controls the screen data for a projector according to functional processing. That is, the mobile terminal generates screen data for a projector to which changed information generated by the functional processing is applied and provides the changed information to the projector module 300. In addition, the mobile terminal generates screen data varying with the control command and provided the generated screen data to the display unit 100.

That is, the mobile terminal generates the screen data for a projector provided to the projector module 300 and the screen data for a display unit provided to the display unit 100 in response to the control command and provides the generated screen data. The dual-processed screen data is output to the display unit 100 and the projector module 300. The detailed operations will be described later.

However, at step (821), when the input event is not a control command, the mobile terminal determines whether the input event is a return command (S825). When the input event is not a return command (S825), the mobile terminal may process an operation corresponding to the input event (S827). For example, the mobile terminal may perform operation of turning the projector module 300 off and inactivating the projector function.

When the input event is a return command (S825), the mobile terminal processes the common screen data in response to the return command (S829). That is, when the return command is generated, the mobile terminal is changed to the screen data before performing the operation according to the execution command. In this case, the mobile terminal generates the screen data for a projector provided to the projector module and the screen data for a display unit provided to the display unit 100 in response to the return command, and dual-processes the respective generated screen data, that is, the common screen data to provide the dual-processed common screen data to the display unit 100 and the projector module 300.

Next, as described with reference to FIGS. 1 to 8, the dual-process of the screen data in a mobile terminal having a projector function will be described with reference to schematic signal flow according to FIG. 9.

Figure 9:
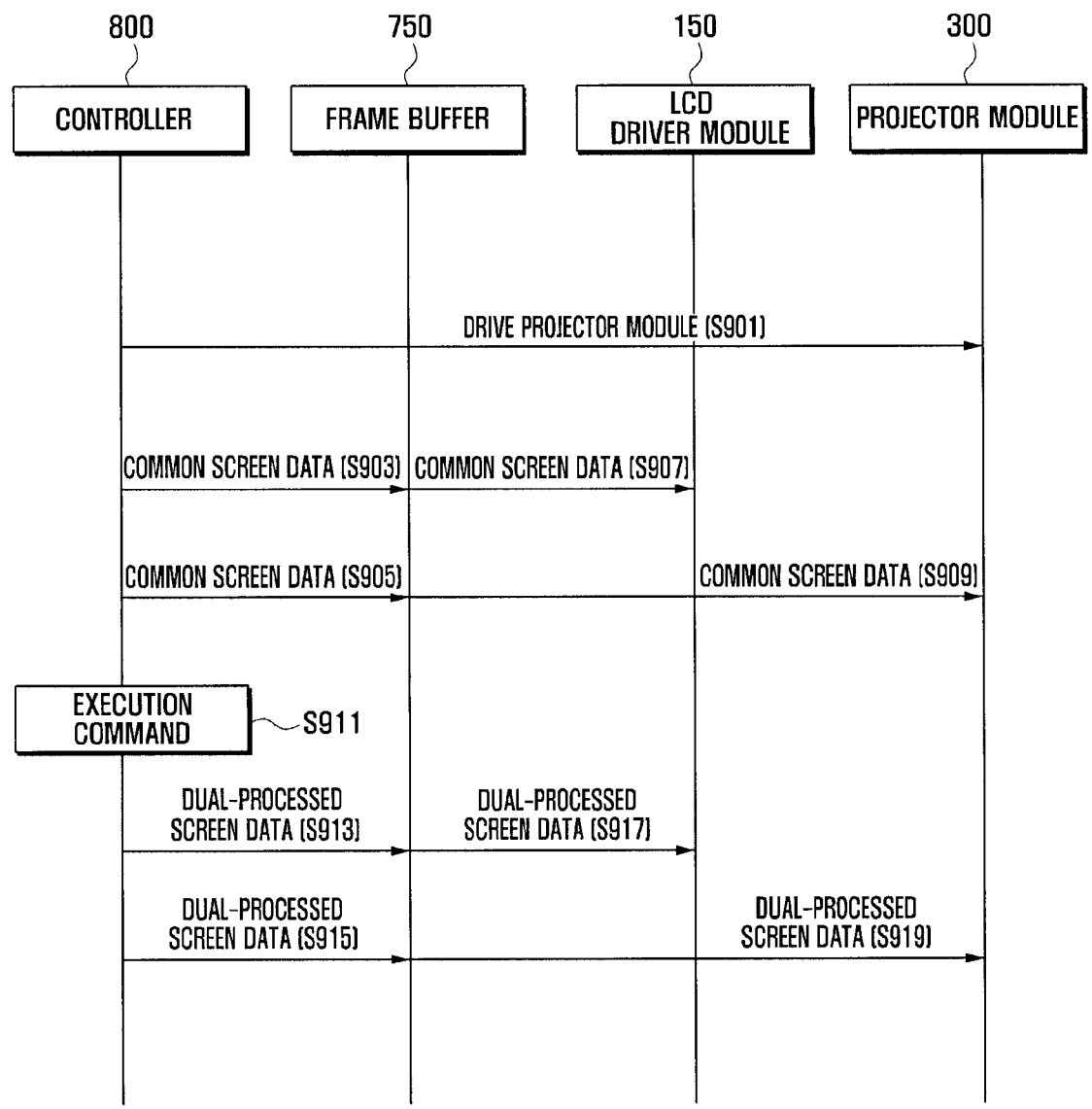
FIG. 9 is a sequence diagram schematically illustrating signal flow during dual-processing of screen data in a mobile terminal according to an exemplary embodiment of the present invention.
Figure 10:
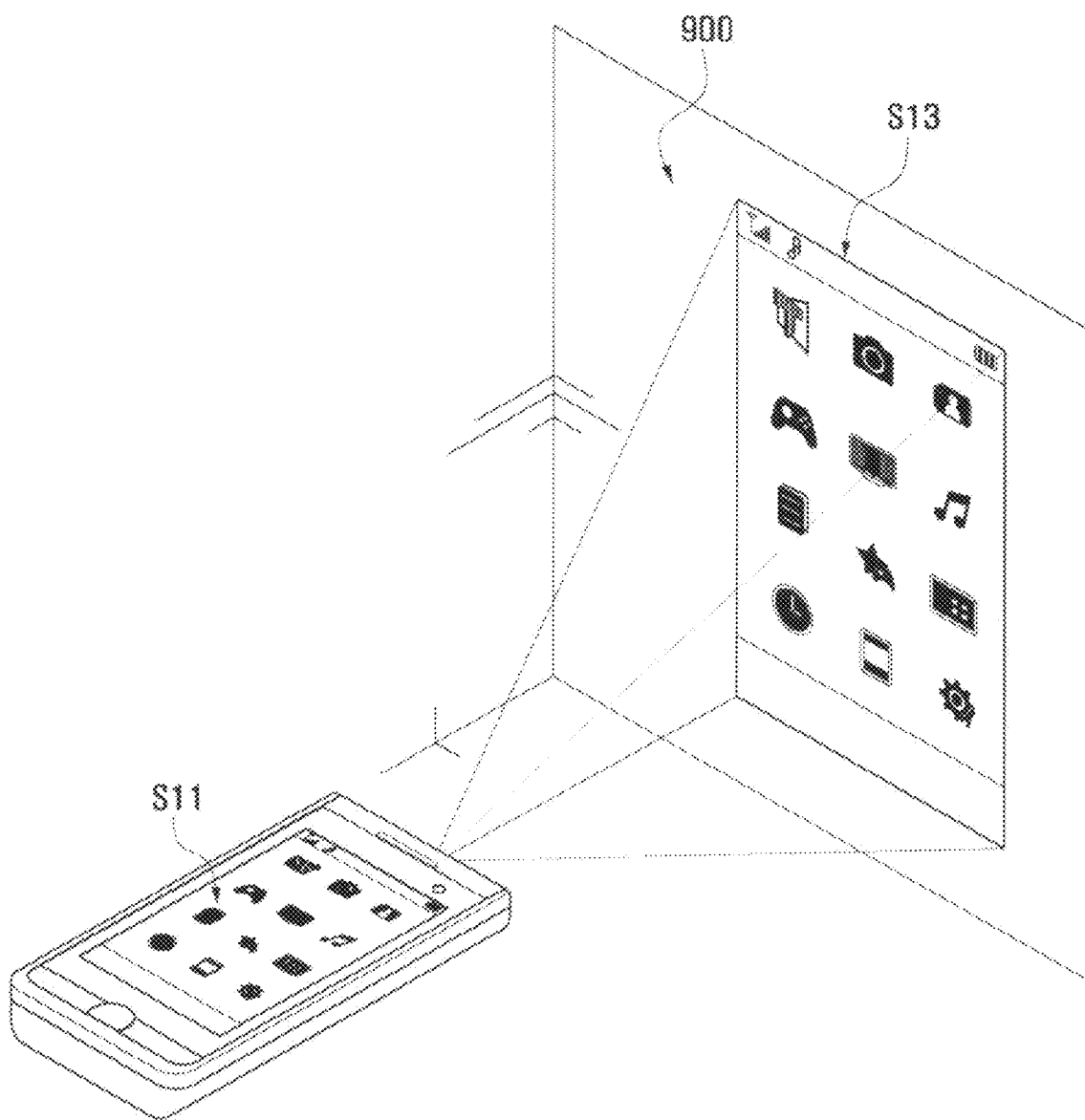
FIGS. 10 and 11 are perspective views illustrating examples of a screen to display common screen data and dual-processed screen data in a mobile terminal according to an exemplary embodiment of the present invention.
Figure 11:
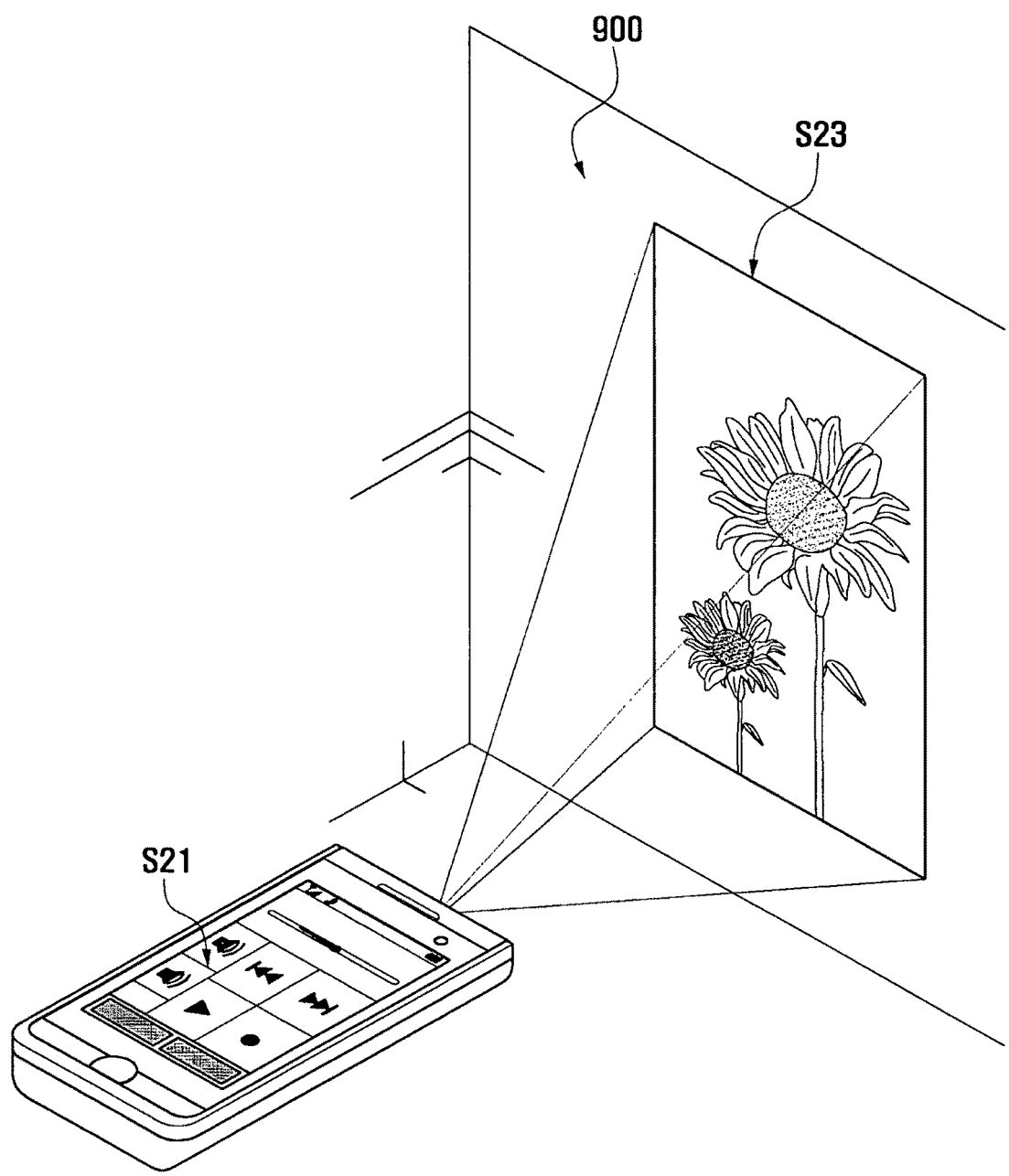

FIG. 9 is a sequence diagram schematically illustrating signal flow during dual-processing of screen data in a mobile terminal according to an exemplary embodiment of the present invention, and FIGS. 10 and 11 are perspective views illustrating exemplary screens to display common screen data and dual-processed screen data in a mobile terminal according to an exemplary embodiment of the present invention.

Referring now to FIGS. 1 to 9, the controller 800 drives the projector module 300 in response to a user request for driving the projector module 300 (S901).

The controller 800 generates and dual-processes the common screen data and outputs the common screen data to the LCD driver module 150 and the projector module 300 (S907 and S909) via the frame buffer 750 (S903 and S905).

In this case, as the controller 800 provides the same screen data (screen data for a projector) as the screen data displayed on the display unit 100 (screen data for a display) to the projector module 300 during the driving of the projector module 300. That is, the controller 800, when the projector module 300 is driven, generates and dual-processes the screen data (for a display) previously provided through the LCD driver module 150 and the screen data (for a projector) having the same screen configuration as the screen data for a display unit, and provides the screen data for a display unit to the display unit 100 and the screen data for a projector to the projector module 300 respectively. The screen data for a display unit and the screen data for a projector are screen data respectively transmitted to the LCD driver module 150 and the projector module 300 through the frame buffer 750, but having identical screen configuration. This screen configuration is illustrated in FIG. 10.

As illustrated in FIG. 10, the screen data S13 (for a projector) output from the projector module 300 and displayed on the external screen 900 have the same screen configuration as the screen data S11 (for a display unit) output from the LCD driver module 150 and displayed on the display unit 100.

Referring now to FIG. 10, when a user inputs an input event to a specific object of the screen data for a display unit S11, screen data changed according to the input event are provided to the display unit 100. In this case, the screen data provided to the external screen 900 are provided as the same screen data as the changed screen data.

Next, the controller 800 may perform the execution process of the application/function of the specific object and dual-processing of the screen data in response to the execution command (S911) for executing the application/function of the specific object by the user. This execution will be described with reference to FIG. 9 as follows.

When the execution command is generated, the controller 800 generates and dual-processes the dual-processed screen data and outputs the dual-processed screen data to the LCD driver module 150 and the projector module 300 (S917 and S919) through the frame buffer 750 (S913 and S915).

In this case, the controller 800 omits the output of the common screen data (for example, exemplary screen in FIG. 10) displayed on the display unit 100 before the execution command is generated, but generates screen data (for a projector) of application/function according to the execution command and screen data (for a display unit) for functional control with respect to the screen data for a projector. The controller 800 provides the respective generated screen data, that is, the dual-processed screen data to the LCD driver module 150 and the projector module 300.

In other words, when the execution command is generated, the controller 800 generates and dual-processes the screen data for a display unit and the screen data for a projector, corresponding to the execution application/function, and provides the screen data for a display unit executed by the execution command to the display unit 100 and the actual execution screen data executed in response to the application/function, that is, the screen data for a projector to the projector module 300.

The screen data for a display unit and the screen data for a projector are transmitted to the LCD driver module 150 and the projector module 300 through the frame buffer 750 and are the dual-processed screen data having different screen configuration. The dual-processed screen data are illustrated in FIG. 11.

As illustrated in FIG. 11, the screen data S23 (for a projector) output through the projector module 300 and displayed on the external screen 900 have screen configurations different from the screen data S21 (for a display unit) displayed on the display unit 100 through the LCD driver module 150.

With continued reference to FIG. 11, when a user generates an input event on a specific virtual item of the screen data S21 for a display unit, a function mapped to the corresponding virtual item is processed and applied to the screen data for a projector. Thus, in this case, the screen data changed according to the functional processing are provided as the screen data S23 for a projector provided to the external screen 900.

That is, a user may control a function relating to the reproduction of the screen data for a projector using the screen data S21 for a display unit provided to the display unit 100. For example, when an input event (control command) is generated on a specific virtual item of the screen data for a display unit, the controller 800 may identify a function mapped to the corresponding virtual item and may perform a functional control thereof.

When an object executed by an execution command from a user is a specific moving picture file, the screen data for a projector S23 provided to the external screen 900 may be moving screen data corresponding to the moving picture file. In this case, the screen data for a display unit S21 may consist of virtual items for controlling a reproducing function of a moving picture, and a user may control functions such as reproduction/pause, stop, fast forwarding (FF), rewinding (REW), volume control, and recording of the virtual items.

Hereinbefore, the display control using dual-processing of screen data in a mobile terminal having a projector module according to an exemplary embodiment of the present invention has been described with reference to FIGS. 1 to 5. Hereinafter, various screens when the screen data are displayed in a mobile terminal according to an exemplary embodiment of the present invention as illustrated in FIGS. 1 to 9 will be described. However, operations of the mobile terminal are not limited to the following exemplary screens, but may be applied to the following various exemplary embodiments.

Figure 12:
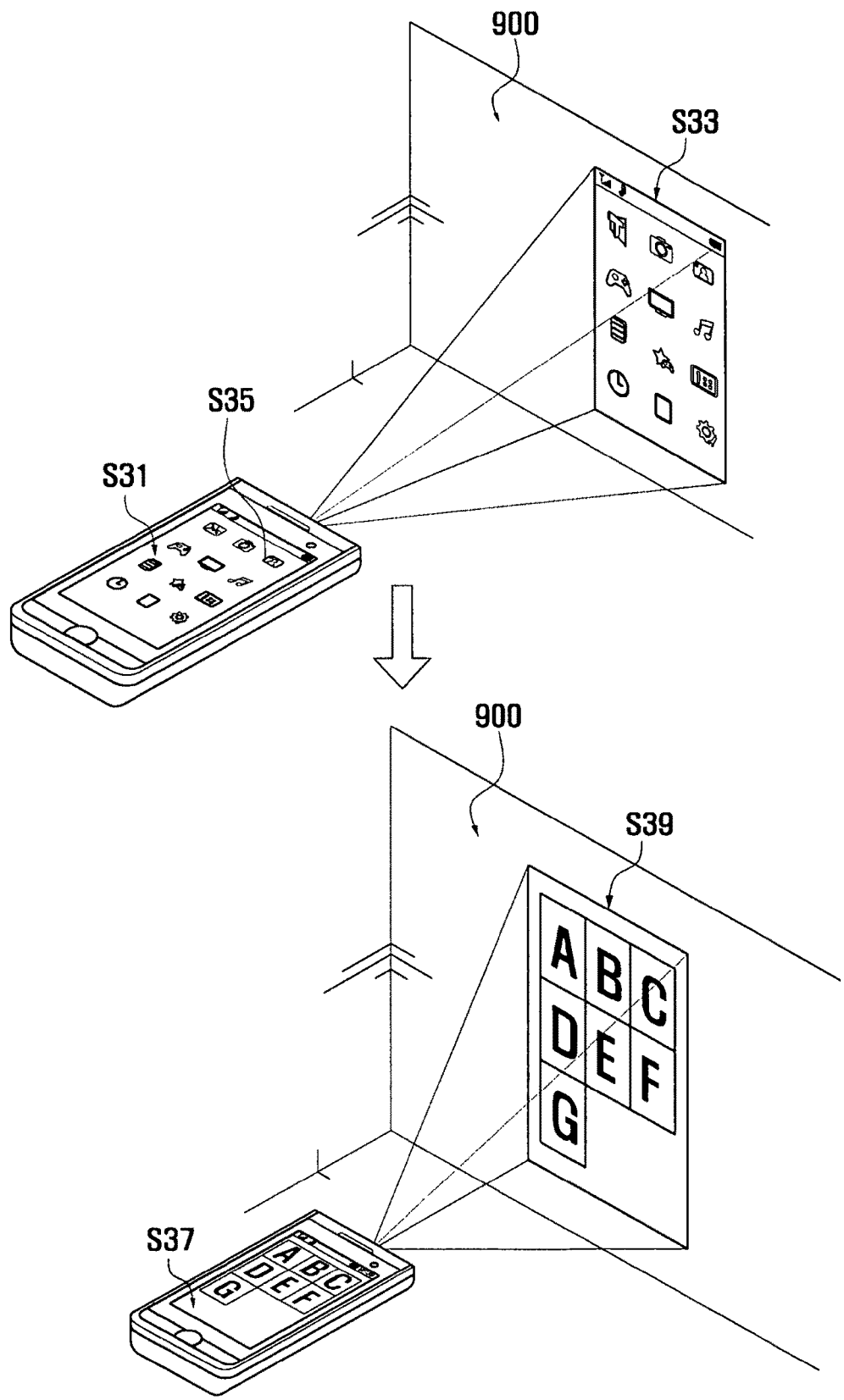
FIGS. 12 to 17 are perspective views illustrating various examples of screens on which screen data are output from a mobile terminal according to an exemplary embodiment of the present invention.

FIG. 12 is a view illustrating an example of a screen on which common screen data are output from a mobile terminal according to an exemplary embodiment of the present invention.

Referring now to FIGS. 1 to 12, screen data S31 (for a display unit) displayed on the display unit 100 through the LCD driver module 150 have the same screen configuration as screen data S33 (for a projector) displayed on the external screen 900 through the projector module 300.

When a user generates a specific object of the screen data for a display unit S31, for example, an input event on an ALBUM object S35, the mobile terminal generates screen data change by the input event (for example, a menu list screen), and dual-processes and provides the screen data as the common screen data. That is, the mobile terminal generates screen data S37 for a display unit and the screen data for a projector, corresponding to the object S35 on which the input event is generated and dual-processes and provides the screen data S37 and S39 to the display unit 100 and the projector module 300. FIG. 12 shows a case of providing the menu list dependent on the ALBUM object as a low ranked menu of the ALBUM object. The menu list, as illustrated in FIG. 12, may be provided, for example, as a thumbnail image list of a block unit or a text list corresponding to user setting and an execution object.

As illustrated inn FIG. 12, it is assumed that the specific object S35 is not a specific application neither an object for execution a function, but rather an object including dependent elements such as low ranked menus. When the object is mapped by a specific application or a function, the mobile terminal does not output the common screen data but the dual-processed screen data. This example is illustrated in FIG. 13.

Figure 13:
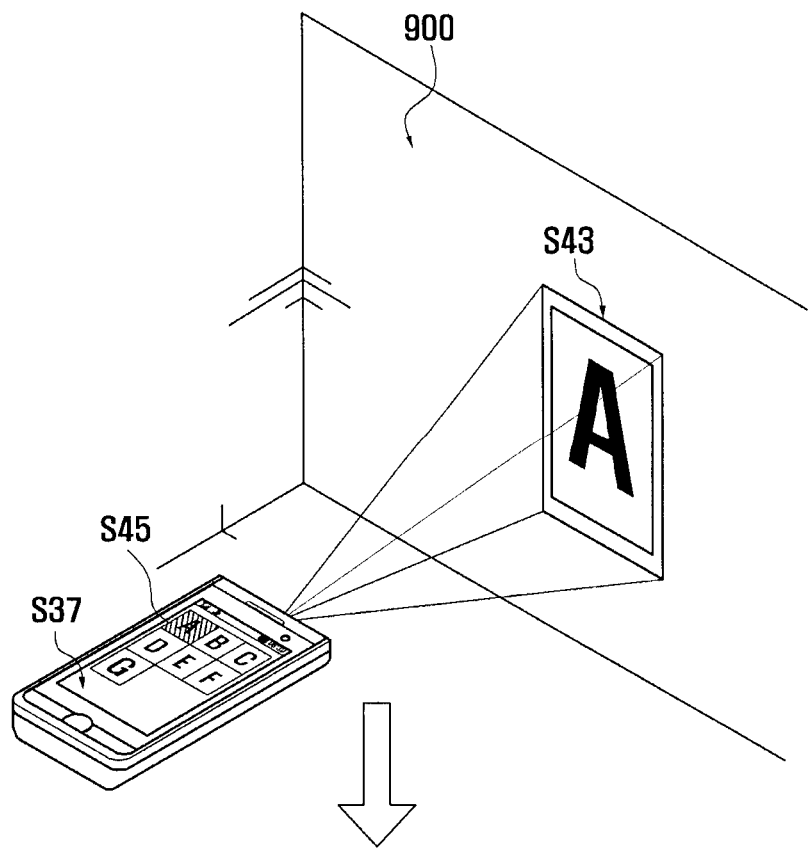
Figure 13:
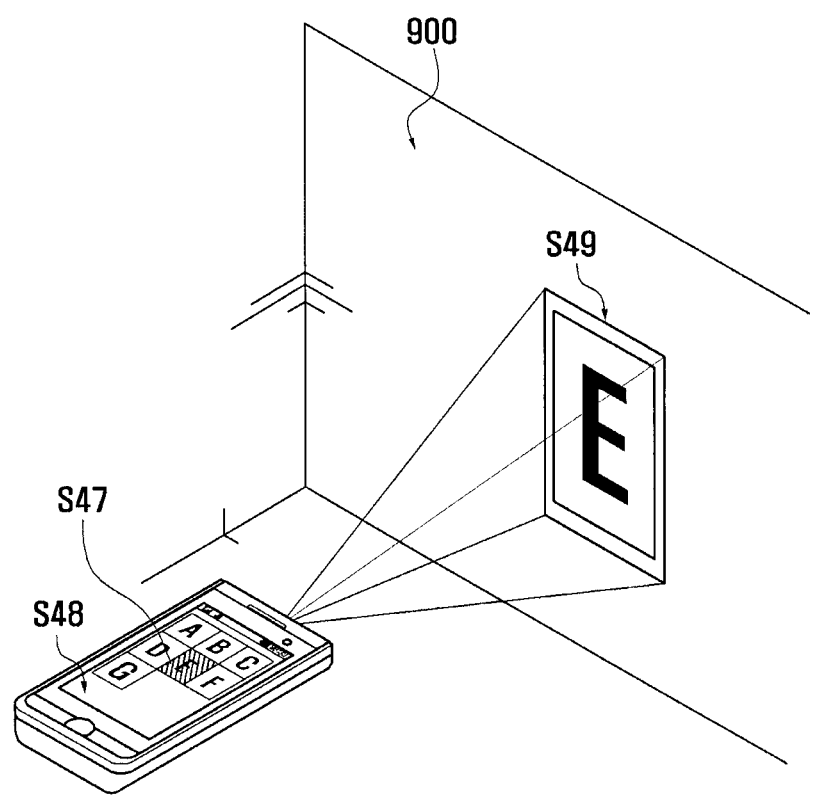

FIG. 13 is a view illustrating a screen on which dual-processed screen data are output in a mobile terminal according to an exemplary embodiment of the present invention. Particularly, FIG. 13 shows a case where the dual-processed screen data are output when an image viewer is executed.

Referring now to FIGS. 1 to 13, in FIG. 13, a screen data S41 (for a display unit) displayed on the display unit 100 through the LCD driver module 150 and screen data S43 (for a projector) displayed on the external screen 900 through the projector module 300 have different screen configuration. As indicated by reference numerals S37 and S39 in FIG. 12, when a user generates an input event on a specific object S45, the mobile terminal generates screen data changed by the input event and dual-processes and provides the generated screen data as dual-processed screen data. In other words, the mobile terminal generates the screen data for a projector S43 corresponding to the object S45 on which the input event is generated and the screen data for a display unit S41 in which a focus or a highlight for indicating the input event when the input event is generated on the object S45 is displayed, and dual-processes and provides the screen data S41 and S43 to the display unit 100 and the projector module 300.

FIG. 13 shows an example where a corresponding image object S45 is enlarged according to an execution command and is displayed on the external screen 900. That is, FIG. 13 shows a case where a specific application or a macro for executing a function is mapped to the specific object S45 and in this case, the dual-processed screen data are output.

For example, when a user generates an input event on a specific object S47 of the screen data for a display unit S41, the mobile terminal generates screen data changed by the input event and dual-processes and provides the screen data as screen data. In other words, the mobile terminal generates screen data for a projector S49 corresponding to the object S47 on which the input event is generated and screen data for a display unit S48 in which a focus or a highlight for indicating the input event when the input event is generated on the object S47, and dual-processes and provides the screen data S48 and S49 to the display unit 100 and the projector module 300.

When an input event generated by a return command from a user, that is, a return command for entering a stage where the screen data as illustrated in FIG. 12 are provided is transmitted, the mobile terminal generates and outputs the common screen data as described with reference to FIG. 12.

Figure 14:
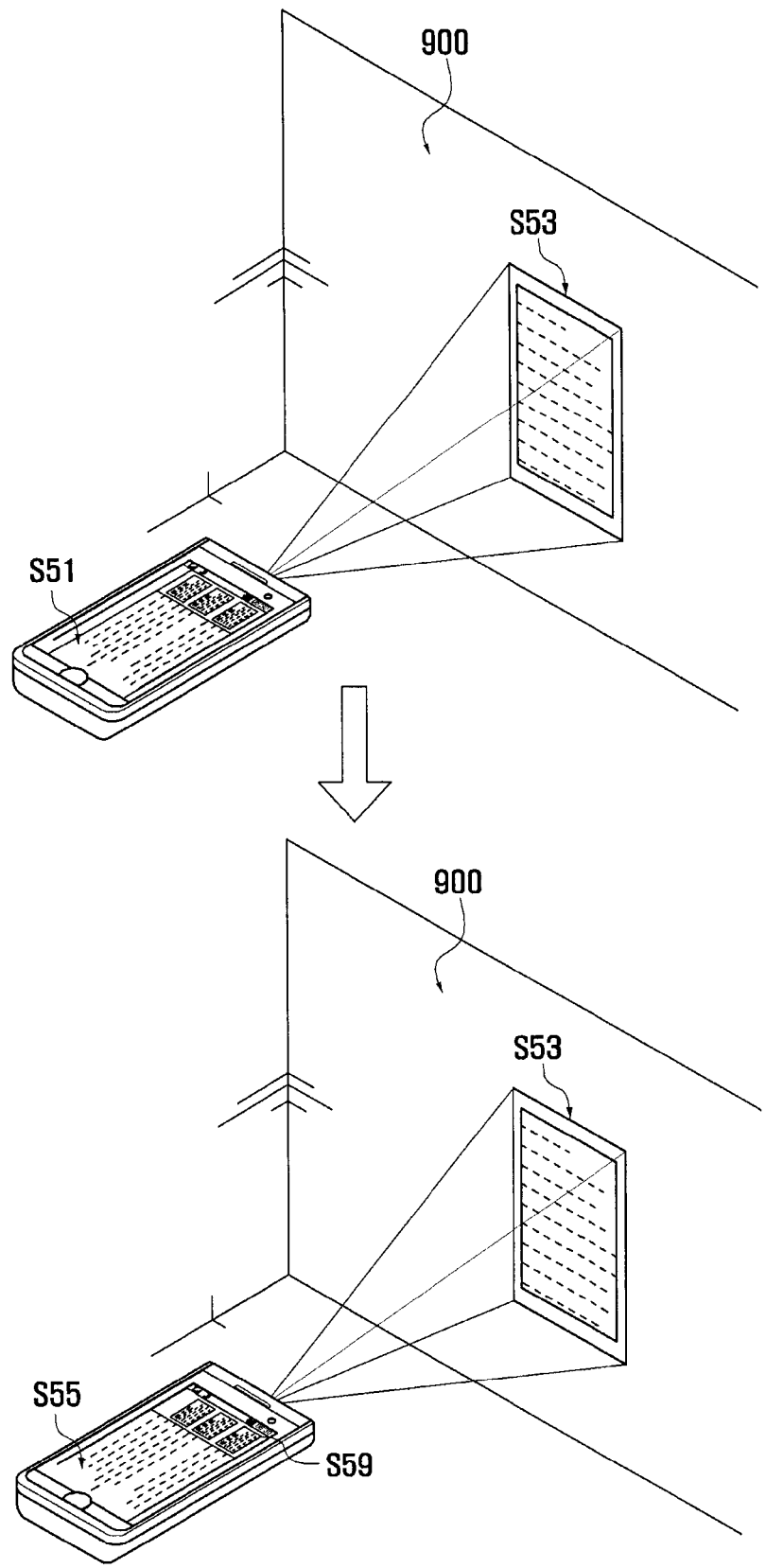

FIG. 14 is a view illustrating another screen on which dual-processed screen data are output in a mobile terminal according to another exemplary embodiment of the present invention. Particularly, FIG. 14 shows an example in which dual-processed screen data are output during the performance of presentation function using a document.

Referring now to FIGS. 1 to 14, in FIG. 14 screen data S51 (for a display unit) displayed on the display unit 100 through the LCD driver module 150 have screen configuration different from screen data S53 (for a projector) displayed on the external screen 900 through the projector module 300. FIG. 14 shows a case where the screen data for a display unit S51 are displayed in the horizontal direction of the display unit 100.

With continued reference to FIG. 14, when a user generates an execution command for controlling the screen data for a projector S53 by selecting an option and the like, the mobile terminal generates screen data changed by the execution command and dual-processes and provides the screen data as dual-processed screen data. In other words, the mobile terminal generates screen data for a display unit S55 and screen data for a projector S57, corresponding to the execution command, and dualizes and provides the screen data S55 and S57 to the display unit 100 and the projector module 300.

FIG. 14 shows a case where, during performance of presentation using a specific document, screen data for editing or modifying information are provided as the screen data for a display unit when presentation such as text change in the document, change of paragraph, turning of pages, and preview is performed.

Thus, when the user transmits an execution command, such as edit or information modification, by selecting a specific option, the mobile terminal may provide an object S59 such as page preview displayed on screen data for a display unit S55. The screen data for a projector provided to the projector module 300 may have screen configuration correspond to the screen data for a projector S53.

Although not depicted in FIG. 14, when a user transmits an execution command on the object S59 of the screen data for a display unit S55, the mobile terminal generates screen data changed by the execution command and dual-processes and provides the screen data.

That is, when an object on which the execution command is generated, for example, an object indicating a specific page is assigned on the page preview object S59, the mobile terminal generates screen data for a projector corresponding to the object and screen data for a display unit changed by the execution command. The mobile terminal dual-processes and provides the screen data to the display unit 100 and the projector module 300.

In this case, the screen data for a projector have screen configurations different from the screen data S53 and S57. In other words, the modified screen data for a projector have a screen configuration of screen data corresponding to a page assigned by a user.

Figure 15:
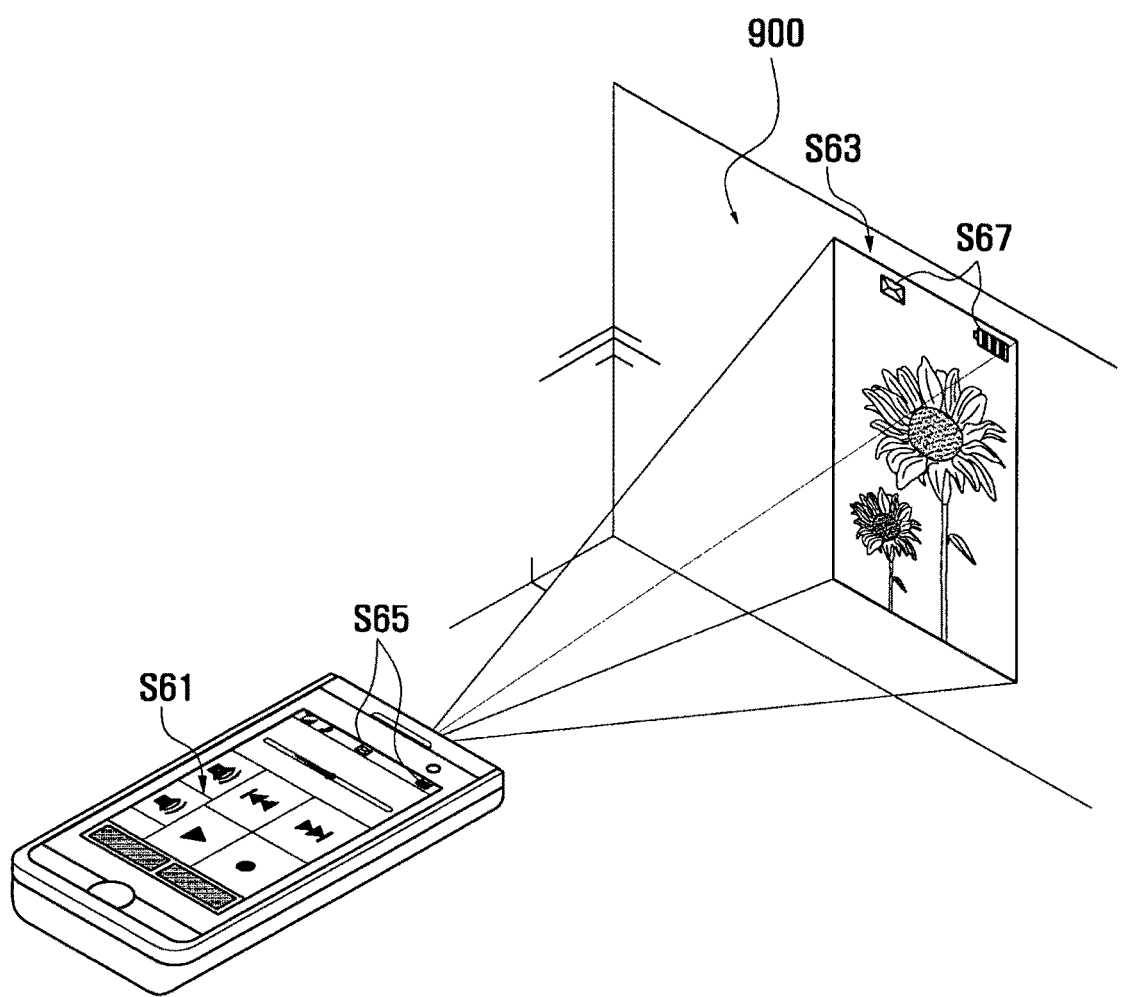
Figure 16:
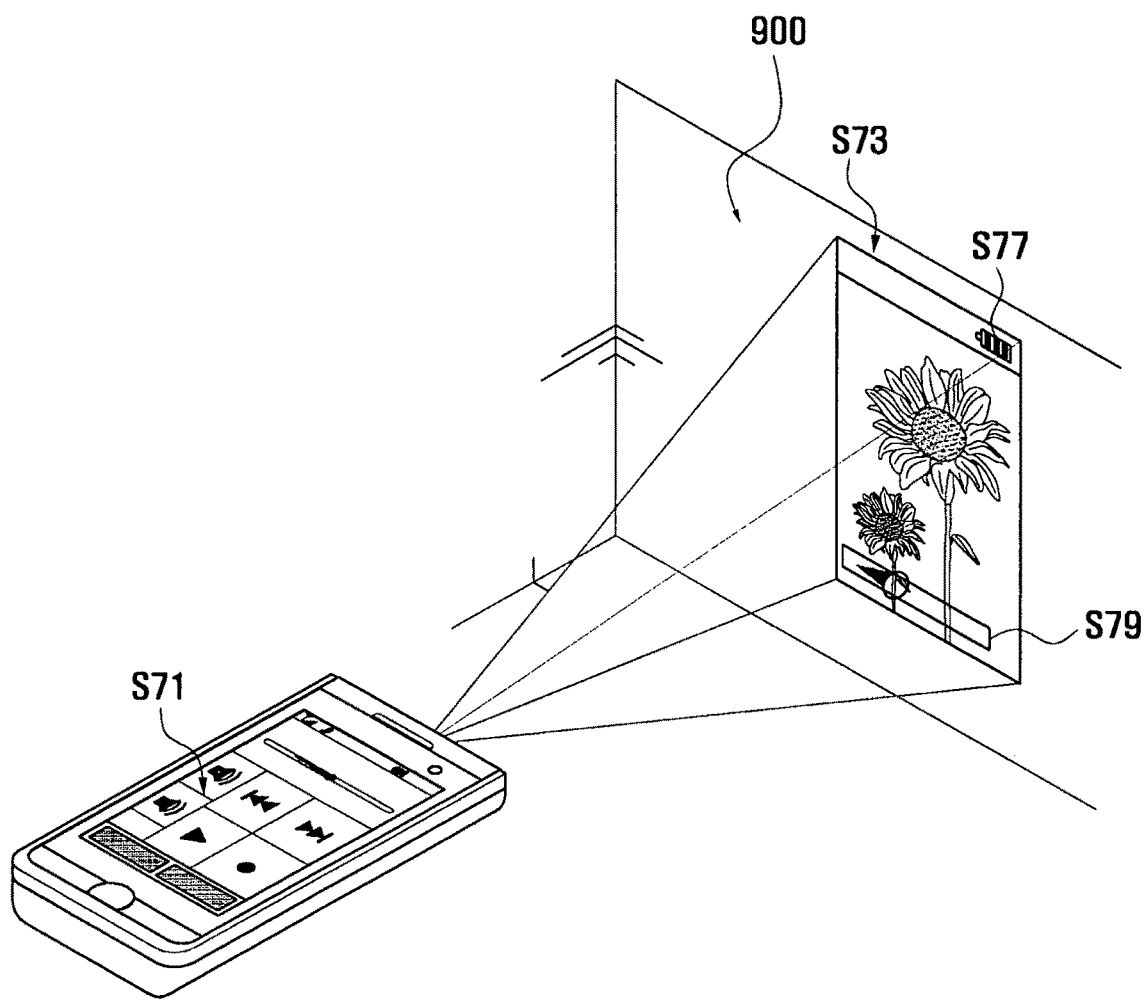

FIGS. 15 and 16 are views illustrating exemplary screens on which dual-processed screen are output with information item in a mobile terminal according to an exemplary embodiment of the present invention.

Referring now to FIGS. 1 to 16, when dual-processed screen data are output to the LCD driver module 150 and the projector module 300, the mobile terminal may provide at least one information item according to user setting. In this case, the information item represent various information to be displayed on the screen data for a projector provided to the projector module 300 and may be provided in an icon type virtual item on the screen data for a projector. The information item according to the user setting may be listed in Table 1.

TABLE 1

| information item | settings | remarks |
| --- | --- | --- |
| battery information | activated/inactivated | |
| text message receiving information | activated/inactivated | |
| call receiving information | activated/inactivated | |
| execution information | activated/inactivated | brief information on execution of application |
| emergency information | activated/inactivated | disaster information, weather information, SOS information, etc. |
| service information | activated/inactivated | |

As listed in Table 1, a user may set information display on at least one of various information items provided by the mobile terminal. The information item includes a battery information item of providing remaining capacity of a battery in the form of an icon, a text message receiving information item of providing received information on text message service such as short message service (SMS), multimedia messaging service (MMS), and E-mail, a call receiving information item of providing call receiving information in the form of an icon when a call is requested by a specific counterparty mobile terminal, an execution information item of providing information on progressing status when a function reproducing multimedia data such as a moving picture or digital broadcasting is executed as a brief virtual item (for example, a progress bar indicating reproducing status), an emergency information item of providing received service information such as disaster information, weather information, and SOS information in the form of an icon, and a service information item of providing received service information such as stock service to which a user joins. The user may set to display an information item corresponding to at least one information item. Although not listed in Table 1, the information item may provide some of or entire various information provided through an indicator region of the mobile terminal.

The display of the information item may be set by a user and at least one information item assigned by the user may be provided to the screen data for a projector displayed on the external screen 900 when the projector function is executed. An exemplary screen is briefly illustrated in FIGS. 15 and 16.

FIG. 15 shows a case when an information item S67 such as battery information and text message receiving information is provided with screen data for a projector S63. The battery information may be always displayed in the screen data for a projector S63 displayed on the external screen 900 by user settings, and the text message receiving information or the call receiving information may be provided whenever a corresponding event (receiving a text message or a call) is generated.

For example, when a text message is received while screen data of specific multimedia data are output to the external screen 900 by the projector function, the mobile terminal may provide an information item S65 indicating the reception of the text message to an indicator region of the display unit 100 on which screen data for a display unit S61 is displayed. In addition, the mobile terminal may provide an information item S67 indicating the reception of the text message to a region of the screen data for a projector displayed on the external screen 900.

In this case, the information item provided to the screen data for a projector S63 may be displayed on a region corresponding to a position where the indicator region is displayed, or may be provided to a region set by a user such as a top side or bottom side where the screen data for a projector S63 does not disturb in order to secure a clean view.

FIG. 16 shows an example where an information item S79 such as a progress bar indicating a progressing state of reproduction of multimedia data such as a moving picture and digital broadcasting is provided with screen data for a projector S73.

As illustrated in FIG. 16, when screen data of specific multimedia data are output to the external screen 900 by a projector function, an information item S79 corresponding to user setting may be provided with the screen data for a projector S73. FIG. 16 shows a case when a batter information item S77 and an execution information item S79 are provided. In FIG. 16, the execution information item is provided as a virtual item such as a progress bar and the execution information item is displayed such that progress state of reproduction of the multimedia data may be checked. In this case, as illustrated in FIG. 16, the execution information item S79 may be omitted from the screen data for a display unit S71 provided to the display unit 100. That is, the screen data for a display unit S71 are provided as screen data for controlling the screen data for a projector S73 and additional information items S77 and S79 may be provided to the screen data for a projector S73.

Figure 17:
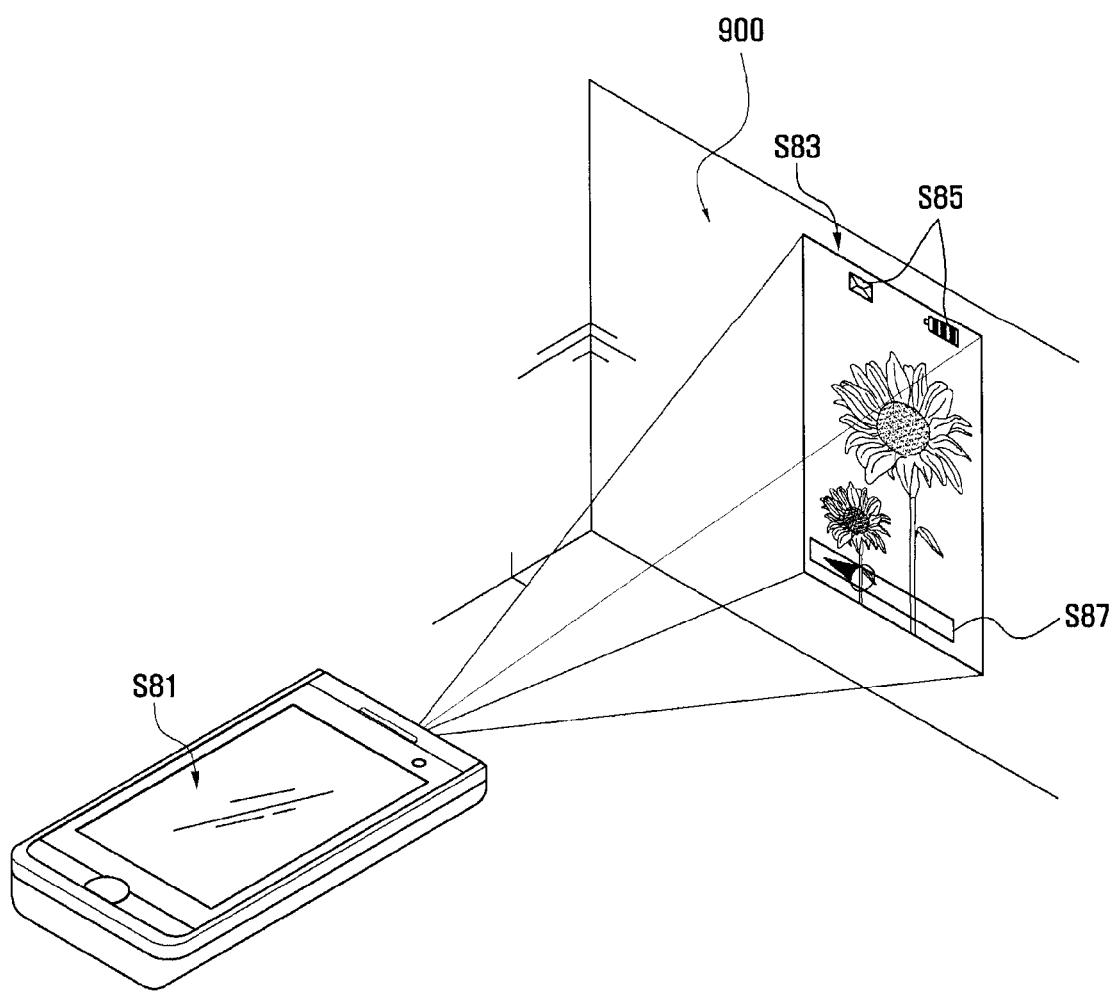

FIG. 17 is a view illustrating different outputs of common screen data and dual-processed screen data in a mobile terminal according to an exemplary embodiment of the present invention.

Referring to FIGS. 1 to 17, the mobile terminal may turn off operations of the display unit 100 as indicated by a reference numeral S81 according to user settings when common screen data or dual-processed screen data are output to the LCD driver module and the projector module 300. In this case, the LCD driver module 150 may be also turned off and dual-processing for providing screen data for a display unit to the display unit 100 may be omitted.

In other words, the mobile terminal may enter power saving mode when none input event is generated for a preset time period during the performance of a projector function according to user settings. The power saving mode may refer to a mode driving operation required to perform the projector function but turning off data processing for providing screen data to the display unit 100 and operations of elements (display unit, LCD driver module) to perform the data processing.

Thus, when the power saving mode is determined, the mobile terminal stops dual-processing for providing the common screen data or the dual-processed screen data. In other words, the mobile terminal skips the generation of screen data for a display unit and turns off the LCD driver module 150 and the display unit 100. In this case, the mobile terminal may generate only screen data for a projector S83 of the common screen data or the dual-processed screen data and may display only the screen data for a projector S83 on the external screen 900 through the projector module 300.

FIG. 17 shows a case when the screen data for a projector of the dual-processed screen data are output. In this case, as illustrated in FIG. 16, the mobile terminal turns off the LCD driver module 150 and the display unit 100 and skips the generation of screen data for a display unit in the power saving mode. That is, in the power saving mode, the mobile terminal generates only the screen data for a projector and provides the generated screen data to the projector module 300.

As illustrated in FIG. 17, when an information item is set by a user, the mobile terminal may provide corresponding information items S85 and S87. That is, the mobile terminal may provide various information items set by a user together with the screen data for a projector in the power saving mode.

As illustrated in FIGS. 15 to 17, according to exemplary embodiments of the present invention, when the projector function is performed, power consumption of a battery may be reduced due to the power saving mode. Moreover, a user may directly check information such as remaining battery capacity information, information on progressing status of reproducing multimedia data, and information on reception of a text message or a call while watching the screen data for a projector displayed on the external screen 900.

As described above, the mobile terminal and the screen data output apparatus according to an exemplary embodiment of the present invention includes: a controller generating respective screen data provided to a display unit and a projector module and outputting the screen data in time division method by performing dual-processing of the screen data; a storage unit buffering the respective screen data transmitted to the display unit and the projector module; an LCD driver module extracting screen data targeting the display unit from the screen data buffered in the storage unit; the display unit displaying the screen data transmitted from the LCD driver module; and the projector module extracting the screen data to be output to an external screen from the screen data buffered in the storage unit and outputting the extracted screen data to the external screen. According to the present invention, due to the dual-processing of the two screen data as described with reference to FIGS. 1 to 17, common screen data or dual-processed screen data may be output to the display unit and the projector module respectively.

As described above, according to the method of controlling dual-processing of screen data in a mobile terminal having a projector function and an apparatus for performing the same, the screen data provided to the display unit of the mobile terminal and the screen data provided to the external screen may be dual-processed when the screen data are output to the external screen using the projector module of the mobile terminal having a projector function. By doing so, the screen data provided to the external screen may be manipulated using the screen data provided on the mobile terminal and the screen data provided by the projector function may be continuously provided to the external screen without visual disturbance.

According to the present invention, when a presentation is performed in a mobile terminal having a projector module, presentation screen data provided to an external screen are dual-processed and individually output, so that the presentation may be conveniently performed without disturbance.

The above-described methods according to the present invention can be realized in hardware or as software or computer code that can be stored in a recording medium such as a CD ROM, a RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

The exemplary embodiments of the present invention are provided for the easy description and understanding of the present invention with specific examples but do not limit the scope of the present invention. It will be appreciated by those skilled in the art that various changes and modifications may be practiced without departing from the spirit of the present invention or the scope of the appended claims.

What is claimed is:

1. A method of outputting screen data in a mobile terminal having a projector function, the method comprising:
    activating a projector module that performs the projector function;
    generating screen data for a display on a display unit of the mobile terminal and screen data for a projection output by the projector module;
    performing dual-processing of the generated screen data and sequentially outputting the dual-processed screen data to each of the display unit and the projector module;
    detecting a progress state of the performance of a function of the mobile terminal; and
    outputting, by the projector module, progress data representing the progress state of the performance of the function of the mobile terminal with the progress data embedded in the screen data being projection output by the projector module,
    wherein the screen data displayed by the display unit does not have embedded therein the progress data representing the progress state.

2. The method of claim 1, wherein outputting the dual-processed screen data comprises outputting the screen data for the projector module as common screen data having an identical screen configuration as the display unit, or outputting the dual-processed screen data having a different screen configuration than the display unit.

3. The method of claim 2, further comprising performing a functional control to the screen data for the projector module using the screen data for the display unit of the dual-processed screen data.

4. The method of claim 2, wherein the outputting further comprises:
generating dual-processed screen data having different screen configurations in response to an execution command on a specific object during the outputting of the common screen data; and
performing dual-processing of the dual-processed screen data and outputting the dual-processed screen to the display unit and the projector module.

5. The method of claim 2, wherein the screen data for the projector module of the dual-processed screen data comprise an information item set by a user setting.

6. The method of claim 2, further comprising omitting an output of the screen data for the display unit after a preset time has lapsed when the screen data for the display unit and the screen data for the projector module are output to the display unit and the projector module.

7. The method of claim 2, further comprising providing an information item corresponding to an event that is generated in the mobile terminal through the screen data for the projector module.

8. A screen data outputting system of a mobile terminal, comprising:
a processing module performing dual-processing of screen data into screen data for a display unit and screen data for a projector module to generate two screen data when a projector function is performed;
a module sequentially outputting the screen data to the display unit and the screen data to the projector module, in an alternate manner using a time-division method, as common screen data or dual-processed screen data according to an executed function;
a display module displaying the screen data for a display of the common screen data or the dual-processed screen data; and
a module outputting the screen data for the projector module of the common screen data or the dual-processed screen data to an external screen;
a module detecting progress state of the performance of function of the mobile terminal; and
a module outputting the progress data representing the progress state of the performance of the function of the mobile terminal with the progress data embedded in the screen data being projection output by the projector module,
wherein the screen data displayed by the display module does not have embedded therein the progress data representing the progress state.

9. The screen data outputting system of claim 8, wherein the common screen data comprise two screen data in which the screen data for the display unit have a same screen configuration as that of the screen data for the projector module; and
the dual-processed screen data comprise two screen data in which the screen data for the display unit have a screen configuration differs from that of the screen data for the projector module.

10. The screen data outputting system of claim 9, wherein the screen data for the display unit of the dual-process screen data comprises a virtual item for functional control of the screen data for the projector module of the dual-processed screen data; and
wherein the screen data for the projector module of the dual-processed screen data comprises execution screen data corresponding to the performance of the mobile terminal.

11. The screen data outputting system of claim 9, wherein the screen data for the projector of the dual-processed screen data comprise an information item set by a user.

12. The screen data outputting system of claim 9, wherein the output of the screen data for the display unit is omitted when a preset time has been lapsed during the output of the screen data for the display unit and the screen data for the projector module.

13. A mobile terminal having a projector function, the mobile terminal comprising:
a control unit generating screen data for a display unit targeting a display unit and screen data for a projector targeting a projector module when a projector function is activated, and sequentially outputting the generated screen data in an alternate manner using a time-division method, and detecting a progress state of the performance of a function of the mobile terminal;
the display unit displaying the screen data for the display unit output from the control unit; and
the projector module outputting the screen data for the projector function output from the control unit to an external screen, and outputting the progress data representing the progress state of the performance of the function of the mobile terminal with the progress data embedded in the screen data being output by the projector module,
wherein the screen data displayed by the display unit does not have embedded therein the progress data representing the progress state.

14. The mobile terminal of claim 13, wherein the control unit outputs the screen data for the display unit and the screen data for the projector as common screen data having an identical screen configuration or dual-processed screen data having different screen configuration.

15. The mobile terminal of claim 13, wherein the control unit controls conversion of the dual-processed screen data into the screen data for the projector in response to user control using the screen data for the display unit of the dual-processed screen data.

16. The mobile terminal of claim 13, wherein the control unit outputs the screen data for the projector of the dual-processed screen data to include an information item set by a user.

17. The mobile terminal of claim 16, wherein the control unit omits the output of the screen data for the display unit when a preset time has been lapsed during the output of the screen data for the display unit and the screen data for the projector.

18. The mobile terminal of claim 17, further comprising a frame buffer buffering the screen data for the display unit provided to the display unit and the screen data for the projector provided to the projector module.

19. The mobile terminal of claim 18, wherein the frame buffer divides the screen data for the display unit provided to the display unit and the screen data for the projector provided to the projector module to buffer the same.

20. The mobile terminal of claim 19, wherein the frame buffer comprises:

an LCD frame buffer buffering the screen data for the display unit provided from the control unit to the display unit; and a projector frame buffer buffering the screen data for the projector provided from the control unit to the projector module.

21. The mobile terminal of claim 20, further comprising an LCD driver module extracting screen data targeting the display unit from the screen data buffered by the frame buffer, and providing the extracted screen data to the display unit.

22. A screen data outputting apparatus of a mobile terminal, the apparatus comprising:

a control unit generating respective screen data provided to a display unit and a projector module, performing dual-processing of the screen data, and sequentially outputting the dual-processed screen data in an alternate manner using a time division method, and detecting a progress state of the performance of a function of the mobile terminal;

a storage unit buffering the respective screen data provided to the display unit and the projector module;

an LCD driver module extracting screen data targeting the display unit from the screen data buffered in the storage unit and providing the extracted screen data to the display unit;

the display unit displaying the screen data transmitted from the LCD driver module; and the projector module extracting screen data to be output to an external screen from the screen data buffered in the storage unit and outputting the extracted screen data to the external screen, and outputting the progress data representing the progress state of the performance of the function of the mobile terminal with the progress data embedded in the screen data being output by the projector module, wherein the screen data displayed by the display unit does not have embedded therein the progress data representing the progress state.

23. The screen data outputting apparatus of claim 22, wherein the control unit generates screen data for the display unit displayed on the display unit and screen data for the projector output to the projector module and provides the generated screen data to the storage unit.

24. The screen data outputting apparatus of claim 23, wherein the control unit provides the screen data for the display unit and the screen data for the projector as common screen data having an identical screen configuration or dual-processed screen data having different screen configuration to the storage unit.

25. The screen data outputting apparatus of claim 24, wherein the control unit includes a virtual item for functional control of the screen data for the projector into the screen data for the display unit of the dual-processed screen data and an information item set by a user into the screen data for the projector of the dual-processed screen data to be provided to the storage unit.

26. The screen data outputting apparatus of claim 23, wherein the control unit omits the output of the screen data for the display unit when a preset time has been lapsed during the output of the screen data for the display unit and the screen data for a projector.

27. The screen data outputting apparatus of claim 23, wherein the storage unit comprises a frame buffer buffering common screen data or dual-processed screen data transmitted from the control unit.

28. The screen data outputting apparatus of claim 23, wherein the frame buffer comprises:

an LCD frame buffer buffering the screen data for the display unit transmitted from the control unit to the display unit; and a projector frame buffer buffering the screen data for the projector transmitted from the control unit to the projector module.

* * * * *